United States Patent
Maki et al.

(10) Patent No.: US 9,506,758 B2
(45) Date of Patent: Nov. 29, 2016

(54) DETECTION DEVICE, SENSOR, ELECTRONIC APPARATUS, AND MOVING OBJECT

(71) Applicant: Seiko Epson Corporation, Tokyo (JP)

(72) Inventors: Katsuhiko Maki, Chino (JP); Takashi Nomiya, Matsumoto (JP)

(73) Assignee: Seiko Epson Corporation (JP)

( * ) Notice: Subject to any disclaimer, the term of this patent is extended or adjusted under 35 U.S.C. 154(b) by 305 days.

(21) Appl. No.: 14/217,581

(22) Filed: Mar. 18, 2014

(65) Prior Publication Data

US 2014/0305206 A1  Oct. 16, 2014

(30) Foreign Application Priority Data

Mar. 22, 2013 (JP) ................................ 2013-060874

(51) Int. Cl.
G01C 19/56 (2012.01)
G01C 19/5776 (2012.01)
G01C 19/5762 (2012.01)
G01C 19/5614 (2012.01)
G01C 19/5726 (2012.01)

(52) U.S. Cl.
CPC ....... *G01C 19/5776* (2013.01); *G01C 19/5614* (2013.01); *G01C 19/5726* (2013.01); *G01C 19/5762* (2013.01)

(58) Field of Classification Search
CPC ............. G01C 19/5776; G01C 19/5607; G01C 19/5614; G01C 19/56; G01C 19/5726; G01C 19/5762
USPC ............ 73/504.12, 504.14, 504.02, 504.04
See application file for complete search history.

(56) References Cited

U.S. PATENT DOCUMENTS

| | | | | |
|---|---|---|---|---|
| 6,564,637 B1 * | 5/2003 | Schalk | ............... | G01C 19/5614 73/1.38 |
| 7,178,397 B2 * | 2/2007 | Lee | ..................... | G01C 19/5776 73/504.12 |
| 7,370,531 B2 * | 5/2008 | Yokoi | ................. | G01C 19/5649 73/504.03 |
| 8,171,792 B2 * | 5/2012 | Sameshima | ............ | G01C 19/56 73/504.04 |
| 2009/0084180 A1 | 4/2009 | Yoshida et al. | | |
| 2010/0011858 A1 * | 1/2010 | Sato | ........................ | G01C 19/56 73/504.12 |
| 2010/0206074 A1 * | 8/2010 | Yoshida | ................. | G01C 19/56 73/504.12 |
| 2010/0326189 A1 * | 12/2010 | Sato | ........................ | G01C 19/56 73/504.12 |
| 2011/0197674 A1 * | 8/2011 | Prandi | ................. | G01C 19/5726 73/504.12 |
| 2013/0068019 A1 * | 3/2013 | Takase | ................... | G01C 19/56 73/504.12 |
| 2015/0122022 A1 * | 5/2015 | Maki | .................. | G01C 19/5614 73/504.16 |

FOREIGN PATENT DOCUMENTS

JP  10-145141  5/1998
JP  2009-031007 A  2/2009

* cited by examiner

*Primary Examiner* — Helen Kwok
(74) *Attorney, Agent, or Firm* — Harness, Dickey & Pierce, P.L.C.

(57) ABSTRACT

A detection device includes a driving circuit that drives a vibrator, and a detection circuit that receives a detection signal from the vibrator and performs a detection process of detecting a physical quantity signal corresponding to a physical quantity from the detection signal. The driving circuit performs intermittent driving in which the vibrator is driven in a driving period, and is not driven in a non-driving period, and the detection circuit performs the detection process of the physical quantity signal in the non-driving period of the intermittent driving.

18 Claims, 16 Drawing Sheets

FIG. 6A NORMAL PERIOD
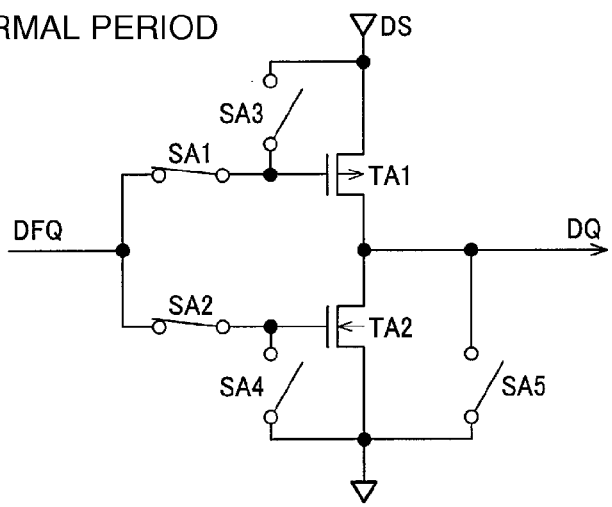
FIG. 6B FIXED VOLTAGE OUTPUT
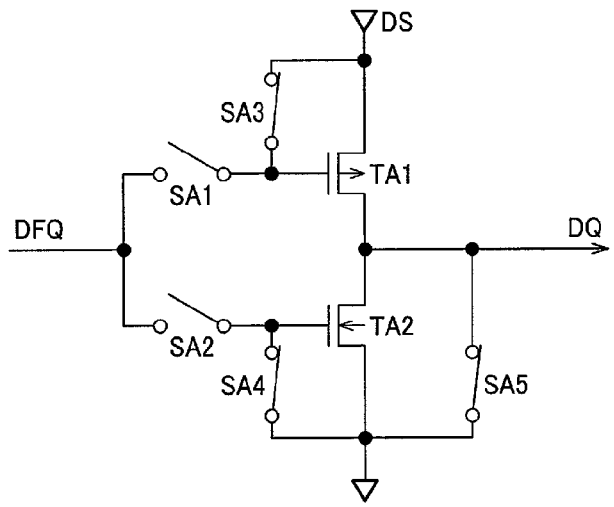
FIG. 6C Hiz STATE
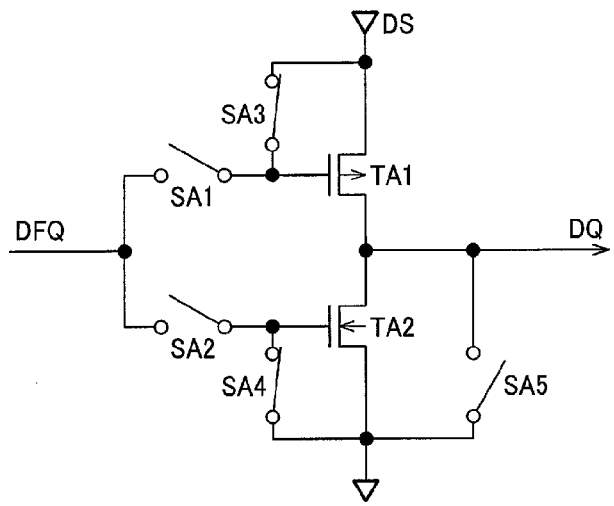

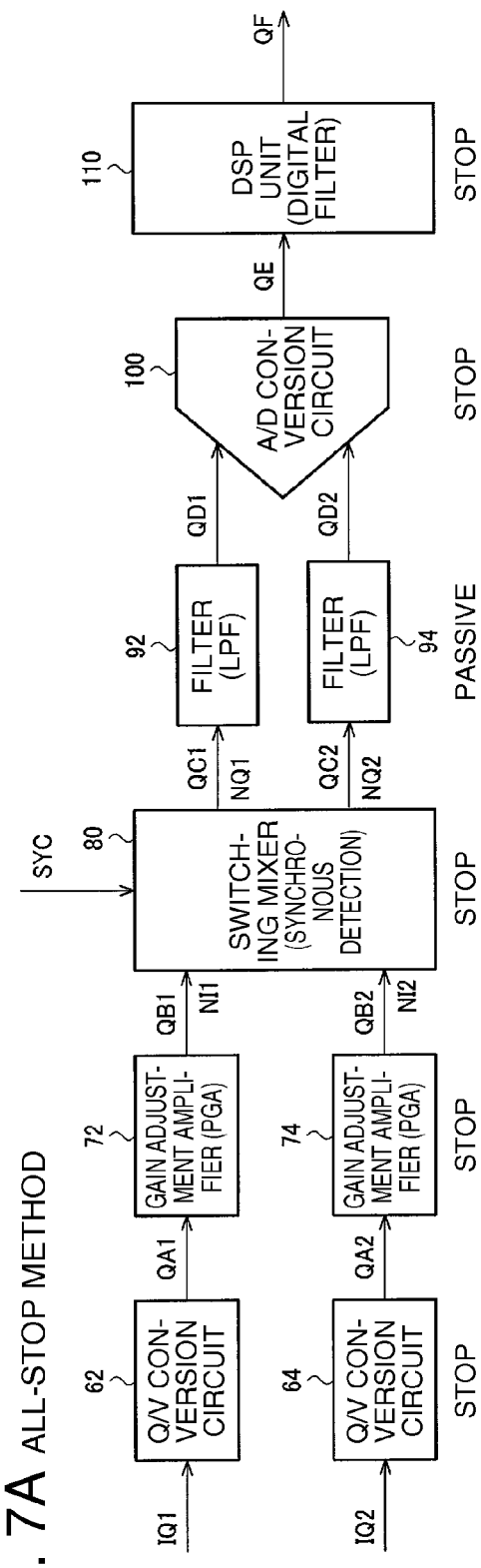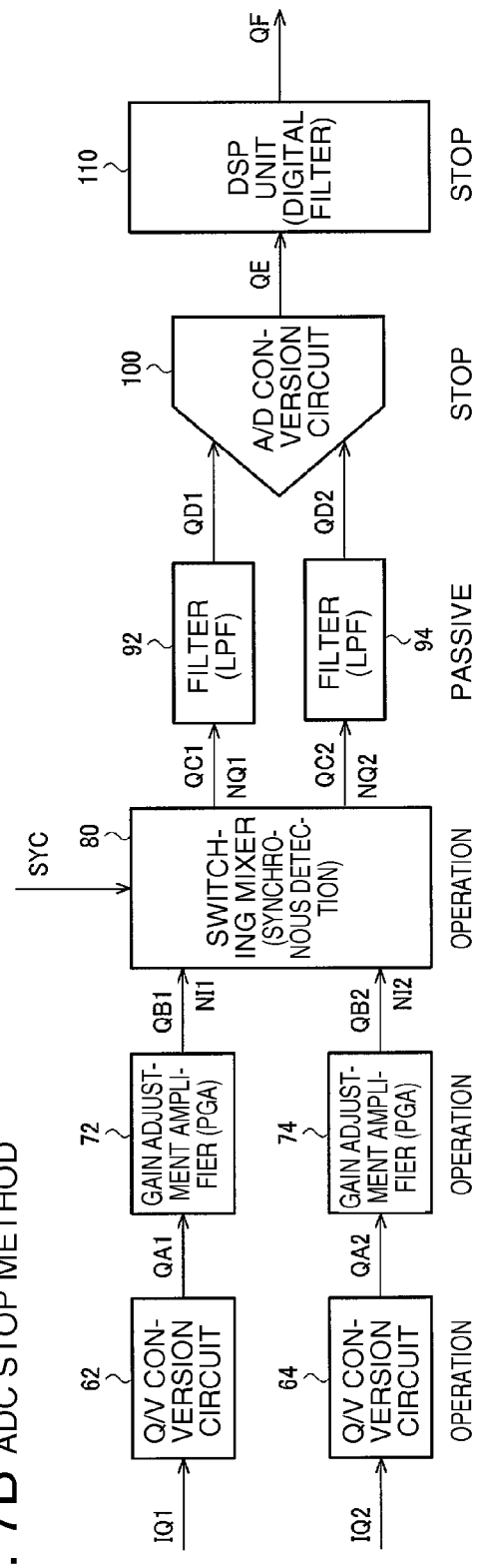

FIG. 9A ALL-STOP METHOD
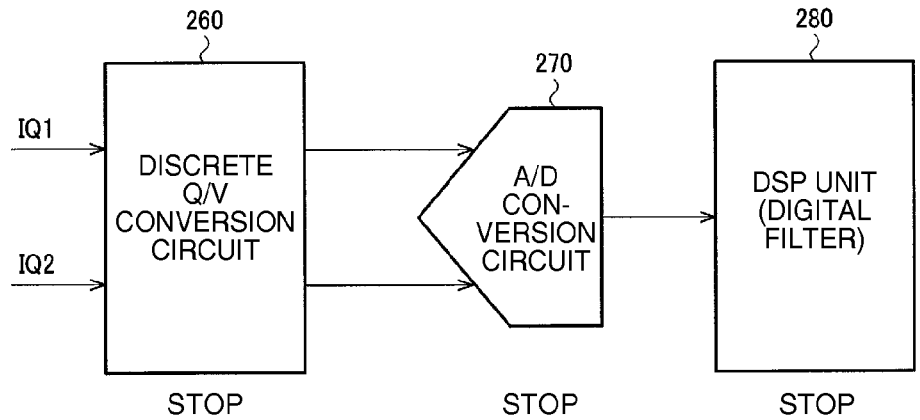
FIG. 9B ADC STOP METHOD
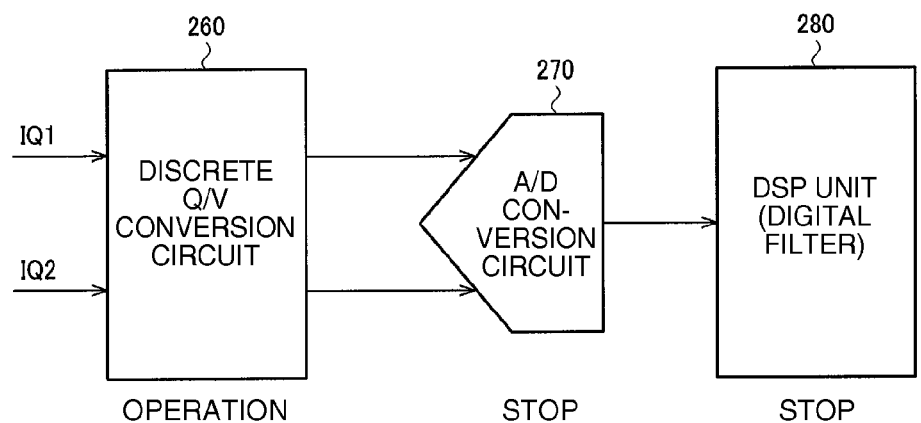
FIG. 9C DETECTION STOP METHOD
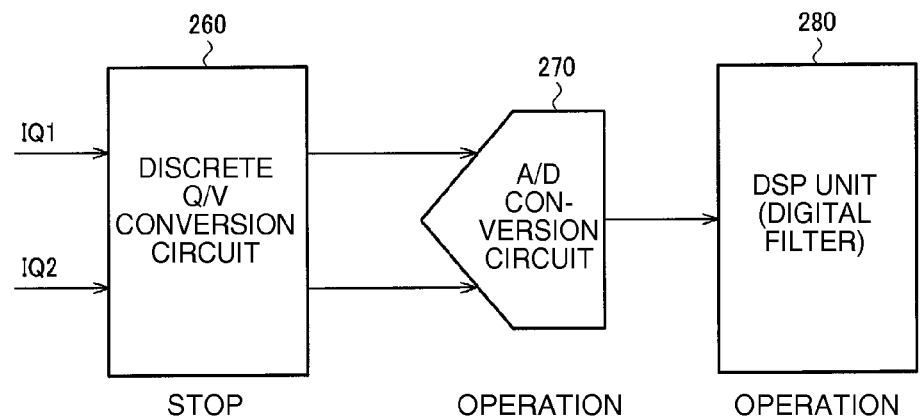

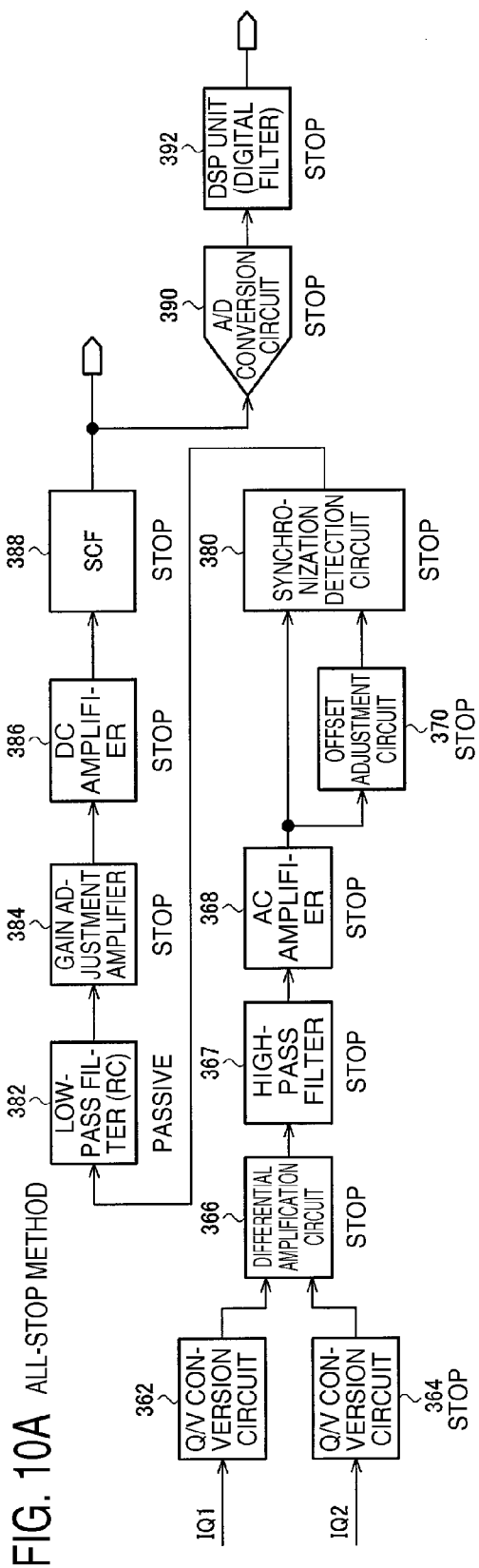
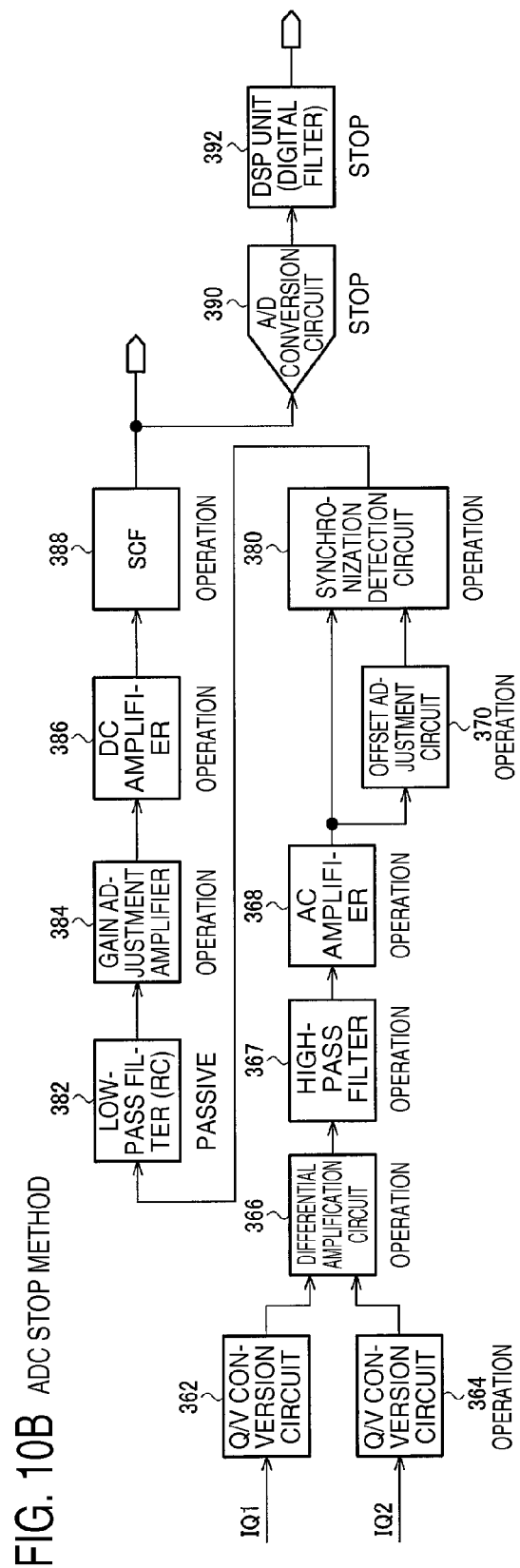

DETECTION DEVICE, SENSOR, ELECTRONIC APPARATUS, AND MOVING OBJECT

BACKGROUND

1. Technical Field

The present invention relates to a detection device, a sensor, an electronic apparatus, and a moving object.

2. Related Art

Gyro sensors for detecting physical quantities which vary depending on external factors are incorporated into electronic apparatuses such as a digital camera, a video camera, a mobile phone, and a car navigation system. The gyro sensors detect physical quantities such as angular velocity, and are used for so-called camera-shaking correction, posture control, GPS autonomous navigation, and the like.

As one of the gyro sensors, there is a vibration gyro sensor such as a quartz crystal piezoelectric vibration gyro sensor. In the vibration gyro sensor, a physical quantity corresponding to a Coriolis force caused by rotation is detected. As a detection device of such a vibration gyro sensor, for example, there is the related art disclosed in JP-A-2009-31007.

In the related art disclosed in JP-A-2009-31007, a vibrator is driven using a rectangular wave driving signal. This is because, even if the vibrator is driven using the rectangular wave driving signal, unnecessary harmonic waves are reduced by an operation of a frequency filter of the vibrator, and thus a driving signal having an aimed resonance frequency can be obtained.

However, in a case where the vibrator is driven using signals such as driving signal, a peripheral member such as a board or a package in which the vibrator is mounted using a tape-automated bonding (TAB) mounting technique happens to resonate with the harmonic components of the driving signal. As a result, the resonance has influence on the vibrator, and thus, unnecessary signals tend to appear in a detection signal. In addition, the vibrator may be kept in a consecutive driving state even after the vibrator becomes an oscillation steady state, and this driving may be useless in terms of reducing power consumption.

SUMMARY

An advantage of some aspects of the invention is to provide a detection device, a sensor, an electronic apparatus, and a moving object capable of realizing a low noise performance or low power consumption.

An aspect of the invention is directed to a detection device including a driving circuit that drives a vibrator; and a detection circuit that receives a detection signal from the vibrator and performs a detection process of detecting a physical quantity signal corresponding to a physical quantity from the detection signal, in which the driving circuit performs intermittent driving in which the vibrator is driven in a driving period, and is not driven in a non-driving period, and in which the detection circuit performs the detection process of the physical quantity signal in the non-driving period of the intermittent driving.

According to the aspect of the invention, the intermittent driving is performed in which the vibrator is intermittently driven by the driving circuit. In addition, the detection circuit receives the detection signal from the vibrator which is intermittently driven and performs the detection process of detecting the physical quantity signal in the non-driving period of the intermittent driving. Thus, it is possible to perform the detection process of the physical quantity signal in the non-driving period in which a low noise state is expected. Further, power consumption can be reduced by the intermittent driving. Therefore, it is possible to provide the detection device which can realize low noise performance or low power consumption through the intermittent driving.

In the aspect of the invention, the driving circuit may include a driving signal output circuit that outputs a driving signal to the vibrator, and the driving signal output circuit may include at least one of a circuit that outputs a fixed voltage and a circuit that sets an output node of the driving signal output circuit to a high impedance state, in the non-driving period.

With this configuration, the driving signal output circuit outputs a fixed voltage or the output node of the driving signal output circuit is set to a high impedance state, and thus it is possible to realize a non-driving state of the driving circuit in the non-driving period of the intermittent driving. In addition, since the vibrator continues its oscillation even if the driving circuit is in the non-driving state as described above, the detection circuit can perform the detection process in the non-driving period.

In the aspect of the invention, the driving signal output circuit may output the driving signal of a rectangular wave in the driving period of the vibrator.

With this configuration, even if the driving is performed using the rectangular wave, unnecessary harmonic waves are reduced due to a frequency filter operation of the vibrator, and thus driving is possible at an aimed driving frequency.

In the aspect of the invention, the detection circuit may include at least one of a synchronous detection circuit that performs synchronous detection and an A/D conversion circuit that performs A/D conversion on the detection signal, and at least one of a synchronous detection operation of the synchronous detection circuit and an A/D conversion operation of the A/D conversion circuit may be stopped in the driving period.

With this configuration, in the driving period, the synchronous detection operation or the A/D conversion operation is stopped, and thus power consumption can be reduced. In addition, even if the synchronous detection operation or the A/D conversion operation is stopped in the driving period, the detection circuit performs the detection process in the non-driving period, and thus an appropriate detection process of a physical quantity signal can be performed.

In the aspect of the invention, the driving circuit may include an amplification circuit that amplifies the detection signal from the vibrator; and a gain control circuit that performs gain control on the basis of an output signal of the amplification circuit. In addition, in the non-driving period, an operation of the amplification circuit may not be stopped, and operations of at least some circuits of the gain control circuit may be stopped.

With this configuration, in the non-driving period, operations of at least some circuits of the gain control circuit are stopped, and thus it is possible to achieve low power consumption. In addition, in the non-driving period, an operation of the amplification circuit is not stopped, and thus the driving circuit supplies the synchronization signal to the detection circuit so that the detection circuit performs the detection process by using the synchronization signal.

In the aspect of the invention, the detection circuit may include a low-pass filter having a frequency characteristic which allows a physical quantity signal corresponding to the physical quantity to pass through the low-pass filter so as to attenuate an unnecessary signal, and when a cutoff frequency of the low-pass filter is fc, lengths of the driving period and the non-driving period are respectively T1 and T2, a relationship of 1/(T1+T2)>fc may be satisfied.

With this configuration, it is possible to prevent a situation in which the detection performance of a physical quantity signal deteriorates due to the repetition frequency of the driving period and the non-driving period in the intermittent driving.

In the aspect of the invention, the detection circuit may not perform the detection process of the physical quantity signal in the driving period, and may perform the detection process of the physical quantity signal in the non-driving period.

With this configuration, the detection circuit does not perform the detection process in the driving period, and thus it is possible to prevent an unnecessary signal or the like occurring in the driving period from exerting adverse influence on the detection performance of the detection circuit.

In the aspect of the invention, the driving circuit may perform the intermittent driving in which the driving period and the non-driving period of the vibrator are alternately repeated.

With this configuration, the driving period and the non-driving period of the vibrator are alternately repeated, and thus the vibrator can continue its vibration operation even if the driving circuit is in a non-driving state in the non-driving period.

In the aspect of the invention, the detection device may further include a mode switching register that sets switching between an intermittent driving mode in which the intermittent driving is performed and a normal driving mode in which continuous driving is performed.

With this configuration, the intermittent driving mode and the normal driving mode can be switched in accordance with various circumstances, and thus it is possible to improve convenience.

In the aspect of the invention, the detection device may further include a period setting register that sets lengths of the driving period and the non-driving period.

With this configuration, it is possible to set a length of the driving period or the non-driving period in accordance with various circumstances such as circumstances in which sensitivity is prioritized or circumstances in which detection efficiency is prioritized.

Another aspect of the invention is directed to a detection device including a driving circuit that drives a vibrator; and a detection circuit that receives a detection signal from the vibrator and performs a detection process of detecting a physical quantity signal corresponding to a physical quantity from the detection signal, in which the driving circuit performs intermittent driving in which a driving period and a non-driving period of the vibrator is alternately repeated, in which the driving circuit includes a driving signal output circuit that outputs a driving signal to the vibrator, and in which the driving signal output circuit includes at least one of a circuit that outputs a fixed voltage and a circuit that sets an output node of the driving signal output circuit to a high impedance state, in the non-driving period of the driving period and the non-driving period of the intermittent driving.

In the aspect of the invention, the intermittent driving is performed in which the driving period and the non-driving period of the vibrator are alternately repeated by the driving circuit. In addition, the driving signal output circuit of the driving circuit outputs a fixed voltage or the output node of the driving signal output circuit is set to a high impedance state, in the non-driving period of the intermittent driving. Thus, if the driving period and the non-driving period of the vibrator are alternately repeated, and the fixed voltage is output or the output node is set to a high impedance state in the non-driving period, the vibrator can continue its vibration operation even if the driving circuit is in a non-driving state in the non-driving period. Therefore, it is possible to prevent wasteful power consumption and to thus realize low power consumption through the intermittent driving.

In the aspect or another aspect of the invention, the detection circuit may include a first current-voltage conversion circuit to which a first detection signal is input; a second current-voltage conversion circuit to which a second detection signal is input; a first gain adjustment amplifier that amplifies an output signal of the first current-voltage conversion circuit through adjustment of a gain; a second gain adjustment amplifier that amplifies an output signal of the second current-voltage conversion circuit through adjustment of a gain; a switching mixer that has a first input node to which the output signal of the first gain adjustment amplifier is input and a second input node to which the output signal of the second gain adjustment amplifier is input, performs synchronous detection on the output signal of the first gain adjustment amplifier and the output signal of the second gain adjustment amplifier which are differential signals on the basis of a synchronization signal from the driving circuit, outputs a first output signal of the first output signal and a second output signal which are differential signals to a first output node, and outputs the second output signal to a second output node; a first filter to which the first output signal from the first output node of the switching mixer is input; a second filter to which the second output signal from the second output node of the switching mixer is input; and an A/D conversion circuit that receives an output signal from the first filter and an output signal from the second filter and performs differential A/D conversion thereon.

According to the detection circuit with this configuration, the number of circuit blocks can be further reduced than in an analog synchronization detection type detection circuit or the like, and it is possible to reduce and remove noise or the like occurring in the first and second current-voltage conversion circuits or the first and second gain adjustment amplifiers by frequency conversion in the switching mixer and filter characteristics of the first and second filters. Therefore, a detection process at low noise can be realized while suppressing a large circuit scale. In addition, the differential signals from the vibrator are subject to the gain adjustment, the synchronous detection process, and the filter process, in a differential signal state, and are input to the A/D conversion circuit so as to undergo the A/D conversion. Therefore, an advantageous configuration is provided in terms of noise reduction as compared with a circuit configuration in which the filter process, the synchronous detection process, the gain adjustment process, and the like are performed in a single-end signal state.

Still another aspect of the invention is directed to a sensor including any of the detection devices described above and the vibrator.

Yet another aspect of the invention is directed to an electronic apparatus including any of the detection devices described above.

Still yet another aspect of the invention is directed to a moving object including any of the detection devices described above.

BRIEF DESCRIPTION OF THE DRAWINGS

The invention will be described with reference to the accompanying drawings, wherein like numbers reference like elements.

FIGS. 6A to 6C are diagrams illustrating a configuration and operation of an output portion of a comparator.

FIGS. 7A and 7B are diagrams illustrating a configuration and operation of a full differential switching mixer type detection circuit.

FIGS. 9A to 9C are diagrams illustrating a configuration and operation of a direct sampling type detection circuit.

FIGS. 10A and 10B are diagrams illustrating a configuration and operation of an analog gyro type detection circuit.

DESCRIPTION OF EXEMPLARY EMBODIMENTS

Hereinafter, preferred embodiments of the invention will be described in detail. The present embodiment described below does not improperly limit the content of the invention disclosed in the appended claims, and all the configurations described in the present embodiment cannot be said to be essential as solving means of the invention. For example, in the following, a description will be made of a case where a physical quantity transducer is a piezoelectric vibrator (vibration gyro) and a sensor is a gyro sensor as an example, but the invention is not limited thereto. For example, the invention is applicable to a capacitance detection type vibrator (vibration gyro) formed of a silicon substrate or the like, or a physical quantity transducer which detects a physical quantity equivalent to angular velocity information and physical quantities other than the angular velocity information or sensors or the like.

1. Electronic Apparatus and Gyro Sensor

Figure 1:
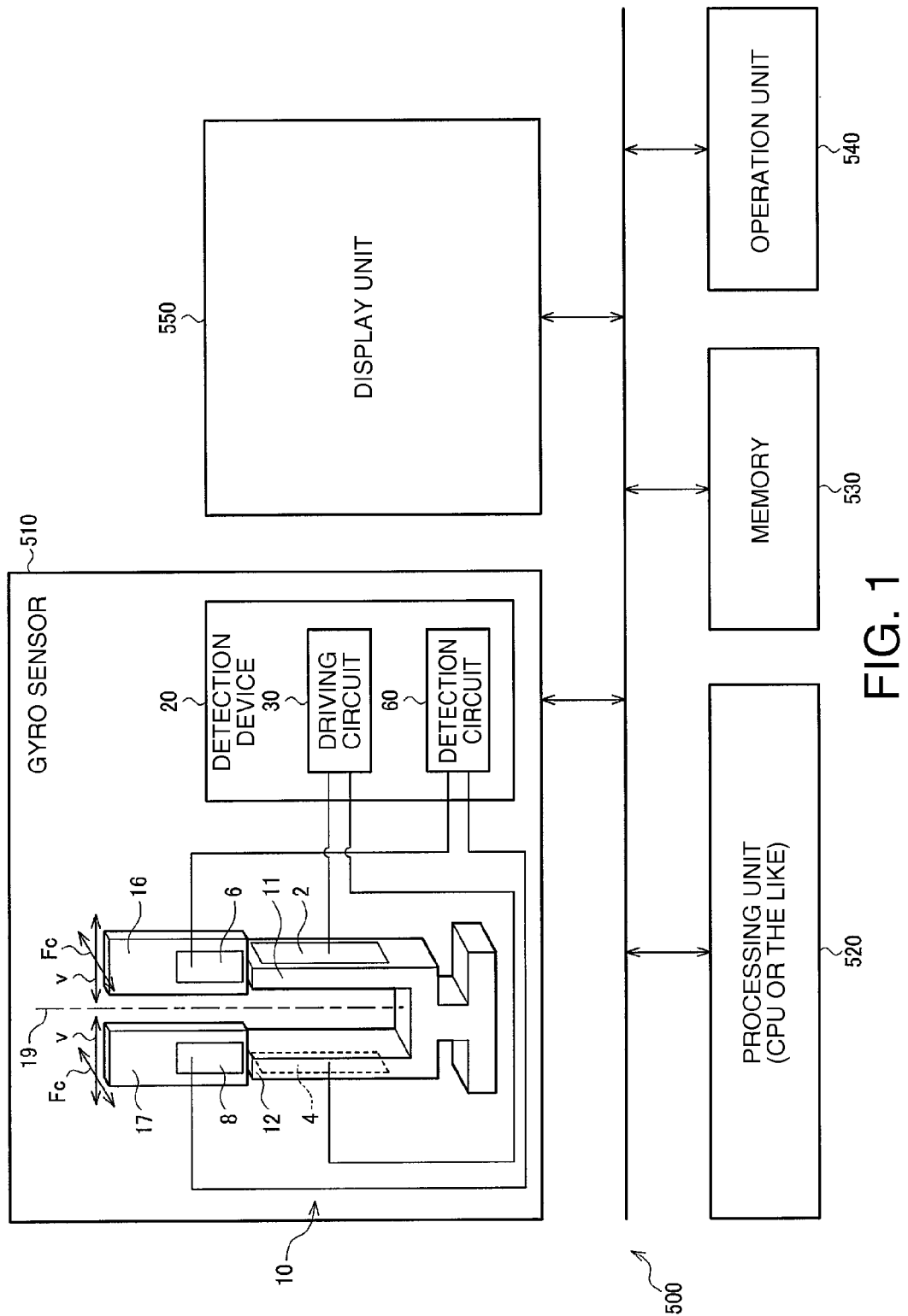
FIG. 1 is a diagram illustrating a configuration example of an electronic apparatus and a gyro sensor.

FIG. 1 illustrates a configuration example of a gyro sensor 510 (a sensor in a broad sense) including a detection device 20 of the present embodiment, and an electronic apparatus 500 including the gyro sensor 510. In addition, the electronic apparatus 500 and the gyro sensor 510 are not limited to the configuration of FIG. 1, and may have various modifications such as omission of some of constituent elements thereof, or addition of other constituent elements. As the electronic apparatus 500 of the present embodiment, various appara- tuses such as a digital camera, a video camera, a mobile phone, a car navigation system, a robot, a game machine, a timepiece, a health apparatus, or a portable information terminal can be assumed.

The electronic apparatus 500 includes the gyro sensor 510 and a processing unit 520. In addition, a memory 530, an operation unit 540, and a display unit 550 may be included. The processing unit 520 (a CPU, an MPU, or the like) performs control of the gyro sensor 510 or the overall control of the electronic apparatus 500. In addition, the processing unit 520 performs a process on the basis of angular velocity information (a physical quantity in a broad sense) detected by the gyro sensor 510. For example, processes for camera-shaking correction, posture control, GPS autonomous navigation, and the like are performed on the basis of the angular velocity information. The memory 530 (a ROM, a RAM, or the like) stores a control program or a variety of data, or functions as a work area or a data storage area. The operation unit 540 is used for a user to operate the electronic apparatus 500, and the display unit 550 displays various information to the user.

The gyro sensor 510 includes a vibrator 10 and the detection device 20. The vibrator 10 (a physical quantity transducer in a broad sense) of FIG. 1 is a tuning folk type piezoelectric vibrator formed of a thin plate which is made of a piezoelectric material such as quartz crystal, and includes driving vibrators 11 and 12 and detection vibrators 16 and 17. The driving vibrators 11 and 12 are respectively provided with driving terminals 2 and 4, and the detection vibrators 16 and 17 are respectively provided with detection terminals 6 and 8.

A driving circuit 30 included in the detection device 20 outputs a driving signal (driving voltage) so as to drive the vibrator 10. In addition, the detection device 20 receives a feedback signal from the vibrator 10, and excites the vibrator 10 by using the feedback signal. A detection circuit 60 receives a detection signal (a detection current, or electric charge) from the vibrator 10 which is driven by the driving signal, and detects (extracts) a desired signal (Coriolis force signal) as a physical quantity signal from the detection signal.

Specifically, an AC driving signal (driving voltage) from the driving circuit 30 is applied to the driving terminal 2 of the driving vibrator 11. Then, the driving vibrator 11 starts vibration due to an inverse voltage effect, and the driving vibrator 12 also starts vibration due to tuning folk vibration. At this time, a current (electric charge) caused by a piezoelectric effect of the driving vibrator 12 is fed back to the driving circuit 30 as a feedback signal from the driving terminal 4. Accordingly, an oscillation loop including the vibrator 10 is formed.

If the driving vibrators 11 and 12 vibrate, the detection vibrators 16 and 17 vibrate at vibration velocity v in the directions illustrated in FIG. 1. Therefore, the current (electric charge) caused by the piezoelectric effect of the detection vibrators 16 and 17 is output from the detection terminals 6 and 8 as detection signals (first and second detection signals). As a result, the detection circuit 60 receives the detection signals from the vibrator 10 and detects a desired signal (desired wave) which is a signal corresponding to a Coriolis force. In other words, when the vibrator 10 (gyro sensor) rotates with respect to a detection axis 19, a Coriolis force Fc occurs in a direction perpendicular to the vibration direction of the vibration velocity v. For example, if the angular velocity during rotation with respect to the detection axis 19 is set to ω, the mass of the vibrator is set to m, and the vibration velocity of the vibrator is set to v, the Coriolis force is indicated by Fc=2mvω. Therefore, the detection circuit 60 detects a desired signal which is a signal corresponding to the Coriolis force, so as to obtain a rotation angular velocity ω of the gyro sensor. In addition, by using the obtained angular velocity ω, the processing unit 520 can perform various processes such as camera-shaking correction, posture control, or GPS autonomous navigation.

FIG. 1 illustrates an example of a case where the vibrator 10 is of a tuning folk type, but the vibrator 10 of the present embodiment is not limited to this structure. For example, a T type or a double T type may be used. In addition, materials other than quartz crystal may be used as a piezoelectric material of the vibrator 10.

2. Detection Device

Figure 2:
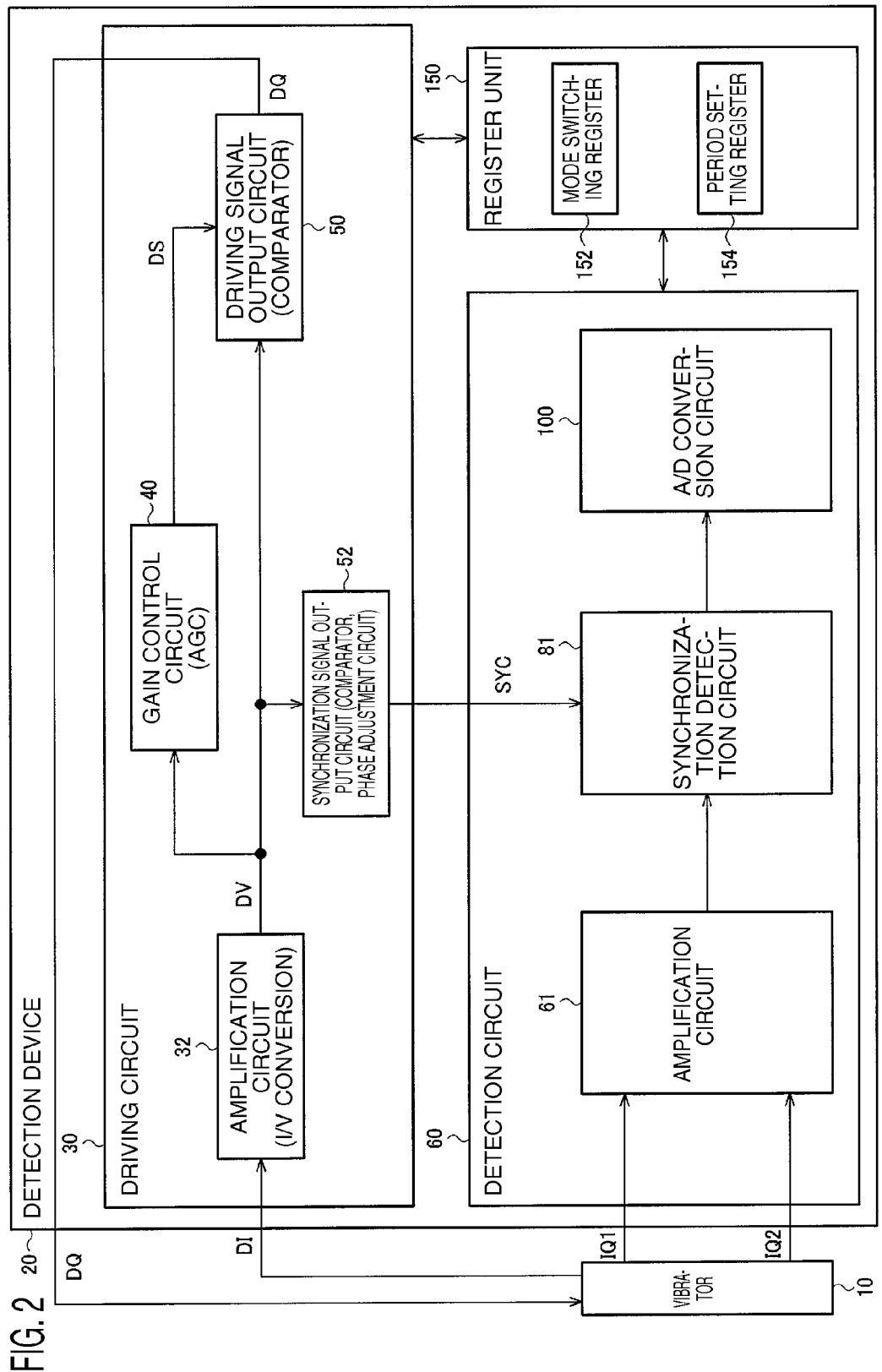
FIG. 2 is a diagram illustrating a configuration example of a detection device.

FIG. 2 illustrates a configuration example of the detection device 20 of the present embodiment. The detection device 20 includes the driving circuit 30 which drives the vibrator 10 (physical quantity transducer), and the detection circuit 60 which receives the first and second detection signals IQ1 and IQ2 from the vibrator 10 and performs a detection process of detecting a desired signal.

The driving circuit 30 includes an amplification circuit 32 to which a signal DI from the vibrator 10 is input; a gain control circuit 40 (automatic gain control: AGC) which performs automatic gain control; a driving signal output circuit 50 which outputs a driving signal DQ to the vibrator 10; and a synchronization signal output circuit 52 which outputs a synchronization signal SYC to the detection circuit 60. In addition, a configuration of the driving circuit 30 is not limited to FIG. 2, and may have various modifications such as omission of some of constituent elements thereof, or addition of other constituent elements.

The amplification circuit 32 (I/V conversion circuit) converts the current signal DI from the vibrator 10 into a voltage signal DV for outputting. The amplification circuit 32 is implemented using a capacitor, a resistive element, an operational amplifier, and the like.

The gain control circuit 40 (AGC) monitors the signal DV, and controls again of the oscillation loop. Specifically, a control voltage DS for controlling a gain of the oscillation loop is output to the driving signal output circuit 50. For example, in the driving circuit 30, in order to maintain sensitivity of the gyro sensor to be constant, it is necessary to maintain an amplitude of a driving voltage supplied to the vibrator 10 (driving vibrator) to be constant. For this reason, the gain control circuit 40 which automatically adjusts a gain is provided in the oscillation loop of the driving vibration system. The gain control circuit 40 variably automatically adjusts a gain so that an amplitude (the vibration velocity v of the vibrator) of the signal DI which is fed back from the vibrator 10 is maintained to be constant. In addition, when vibration starts, a gain of the oscillation loop is set to a gain greater than 1, in order to make high-speed vibration start possible. The gain control circuit 40 may include a full-wave rectifying circuit for converting the AC signal DV from the amplification circuit 32 into a DC signal, an integrator which outputs a control voltage DS corresponding to a difference between the DC signal voltage from the full-wave rectifying circuit and a reference voltage, and the like.

The driving signal output circuit 50 receives the signal DV from the amplification circuit 32 so as to output a driving signal DQ to the vibrator 10. Specifically, the driving signal output circuit 50 outputs the driving signal DQ with an amplitude corresponding to the control voltage DS from the gain control circuit 40. For example, a rectangular wave driving signal is output. The driving signal output circuit 50 may be implemented using a comparator and the like.

The synchronization signal output circuit 52 receives the signal DV from the amplification circuit 32 so as to output the synchronization signal SYC (reference signal) to the detection circuit 60. The synchronization signal output circuit 52 may be implemented using a comparator which binarizes the sinusoidal (AC) signal DV so as to generate the rectangular wave synchronization signal SYC, a phase adjustment circuit (phase shifter) which adjusts a phase of the synchronization signal SYC, and the like.

The detection circuit 60 includes an amplification circuit 61, a synchronous detection circuit 81, and an A/D conversion circuit 100. The amplification circuit 61 receives the first and second detection signals IQ1 and IQ2 from the vibrator 10, and performs signal amplification or electric charge-voltage conversion. The synchronous detection circuit performs synchronous detection on the basis of the synchronization signal SYC from the driving circuit 30. The A/D conversion circuit 100 performs A/D conversion on a signal having undergone the synchronous detection. As a configuration of the detection circuit 60, configurations of various types may be employed. Details thereof will be described later.

The detection device 20 may further include a register unit 150. The register unit 150 includes various registers such as a mode switching register 152, and a period setting register 154. The mode switching register 152 is a register used to set switching between an intermittent driving mode in which intermittent driving is performed, and a normal driving mode in which intermittent driving is not performed but normal driving is performed. In addition, the normal driving mode is a mode in which the vibrator 10 is continuously driven. The period setting register 154 is a register used to set lengths of a driving period and a non-driving period of the intermittent driving. A process of setting a register value in each register of the register unit 150 is performed by a control unit (not illustrated).

3. Intermittent Driving

In the present embodiment, the driving circuit 30 performs intermittent driving in which the vibrator 10 is intermittently driven. Specifically, the driving circuit 30 performs intermittent driving in which a driving period and a non-driving period of the vibrator 10 are alternately repeated.

Here, a driving period of the intermittent driving is a period when the vibrator 10 is driven by the driving signal DQ based on the signal DI which is fed back from the vibrator 10. For example, in the driving period, gain control is performed by the gain control circuit 40 so that a loop gain which is a gain of the oscillation loop becomes 1. In the driving period, the driving signal output circuit 50 of the driving circuit 30 receives the control voltage DS from the gain control circuit 40 which performs the gain control, and outputs the driving signal DQ for controlling the loop gain to be 1, to the vibrator 10.

On the other hand, the non-driving period of the intermittent driving is a period when the driving signal DQ (a driving signal for controlling the loop gain to be 1) based on the signal DI which is fed back from the vibrator 10 is not output from the driving circuit 30. Specifically, in the non-driving period, the driving signal output circuit 50 outputs a fixed voltage or sets an output node thereof to a high impedance state. In other words, in the non-driving period, the driving signal output circuit 50 does not output the rectangular wave (or sinusoidal) driving signal DQ.

In the non-driving period of the driving period and the non-driving period of the vibrator 10 of the intermittent driving, the detection circuit 60 performs a detection process of a desired signal (Coriolis force signal) as a physical quantity signal. Specifically, the detection circuit 60 does not perform a detection process of a desired signal in the driving period of the intermittent driving, and performs the detection process of a desired signal in the non-driving period of the intermittent driving.

As illustrated in FIG. 2, the driving circuit 30 includes the amplification circuit 32 which amplifies the detection signal DI from the vibrator 10 and the gain control circuit 40 which performs gain control on the basis of the output signal DV from the amplification circuit 32. In addition, in the non-driving period of the intermittent driving, an operation of the amplification circuit 32 may not stop, and, on the other hand, operations of at least some circuits (for example, an integrator) of the gain control circuit 40 may stop. For example, at least some circuits of the gain control circuit 40 may be set to an operation disable state (for example, stopping of an operation current).

On the other hand, the detection circuit 60 includes at least one of the synchronous detection circuit 81 which performs synchronous detection, and the A/D conversion circuit 100 which performs A/D conversion on a detection signal. In addition, in the driving period, at least one of a synchronous detection operation of the synchronous detection circuit 81 and an A/D conversion operation of the A/D conversion circuit 100 is stopped. For example, the supply of the synchronization signal SYC to the synchronous detection circuit 81 is stopped, and thus the synchronous detection operation is stopped. Alternatively, the A/D conversion circuit 100 stops a sampling operation of an input signal, so as to stop the A/D conversion operation.

Figure 3:
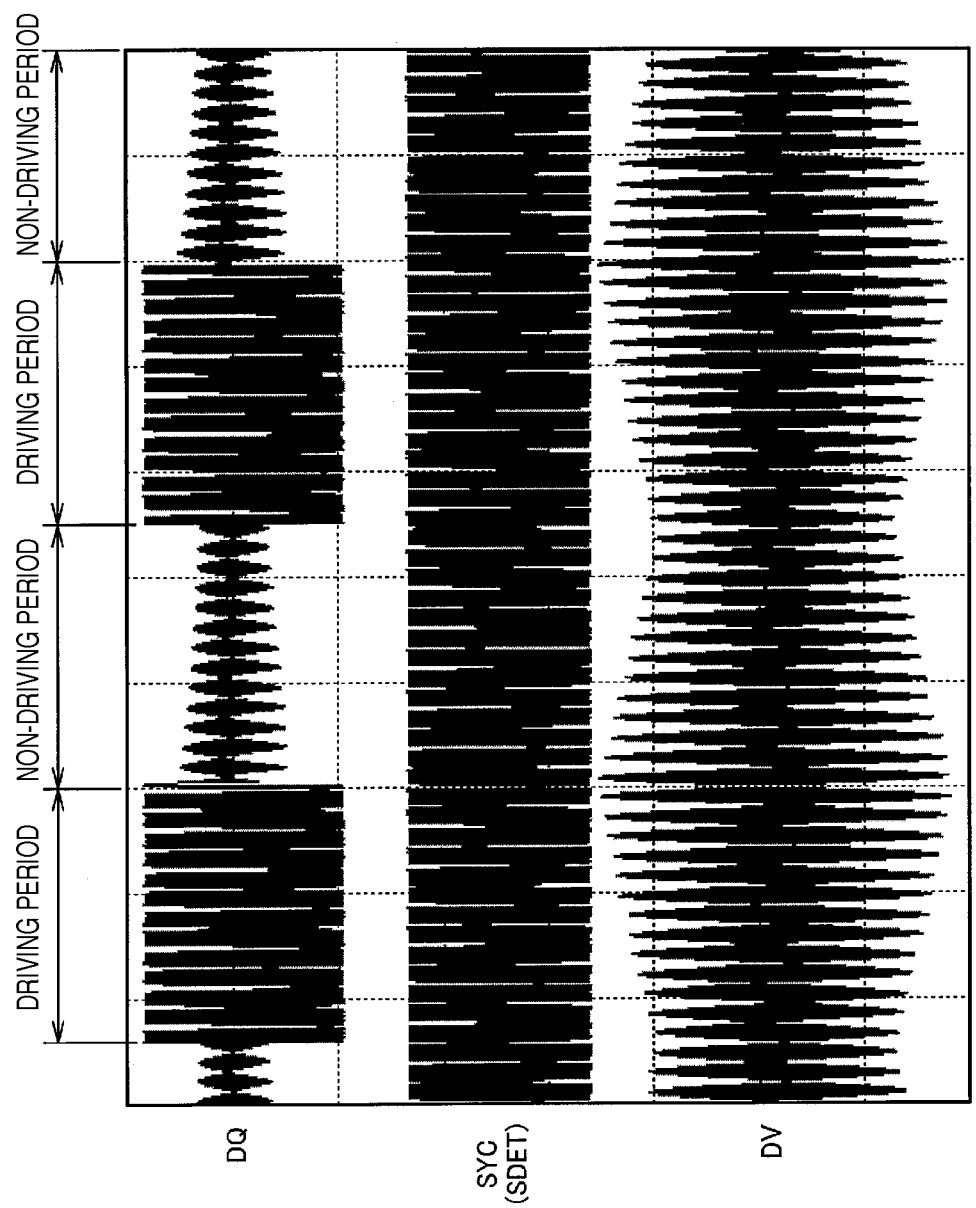
FIG. 3 is a diagram illustrating an intermittent driving method according to the present embodiment.

FIG. 3 illustrates signal waveform examples of various signals of the driving circuit 30. FIG. 3 illustrates the intermittent driving in which the driving period and the non-driving period are alternately repeated. For example, the driving circuit 30 outputs the rectangular wave driving signal DQ in the driving period, and sets the output node thereof in a high impedance state in the non-driving period.

As illustrated in FIG. 3, even in a case where there is the non-driving period of the driving circuit 30 due to the intermittent driving, an oscillation operation of the vibrator is not stopped, and the oscillation operation is continuously performed. For example, even if the driving circuit 30 sets the output node to a high impedance state in the non-driving period, the oscillation operation of the vibrator 10 is not stopped but continuously performed. For this reason, a sinusoidal signal is observed in a node of the driving signal DQ. In addition, not only in the driving period but also in the non-driving period, the synchronization signal SYC from the synchronization signal output circuit 52 is continuously output. Further, the output signal DV of the amplification circuit 32 is observed to have the reduced amplitude caused by the non-driving period, but is a signal indicating an oscillation state.

As described above, if the intermittent driving of repeating the driving period and non-driving period is performed, current consumption is reduced in the non-driving period, and thus it is possible to realize low power consumption. In addition, even in a case of achieving the low power consumption through the intermittent driving, an oscillation operation of the vibrator 10 is not stopped, and the synchronization signal SYC can be supplied to the detection circuit 60. Therefore, a detection process in the detection circuit 60 can be appropriately performed. In other words, it is possible to realize low power consumption and an appropriate detection process in a compatible manner.

In addition, for example, in a case where the driving circuit 30 drives the vibrator 10 by using the rectangular wave driving signal DQ, the driving signal DQ includes not only a frequency component of a driving frequency but also harmonic components. A peripheral member such as TAB or a package in which the vibrator 10 is mounted is resonant with the harmonic components, and thus there is a concern that an unnecessary signal may occur. In other words, if a resonance frequency of the peripheral member matches a frequency of the harmonic component of the driving signal DQ, a temporary resonant phenomenon occurs, and thus an unnecessary signal is generated in a detection signal. Therefore, there is a concern that an S/N ratio of the detection signal may decrease due to the unnecessary signal, and thus the detection performance of the detection circuit 60 may deteriorate.

Therefore, in the present embodiment, the detection circuit 60 does not perform a detection process of a desired signal in the driving period of the intermittent driving, and performs the detection process of a desired signal in the non-driving period. In other words, as illustrated in FIG. 3, attention is paid to the fact that the oscillation operation does not stop even in the non-driving period of the intermittent driving, and the synchronization signal SYC is normally output to the detection circuit 60, and the detection process is performed using the synchronization signal SYC in the non-driving period.

In other words, at a driving frequency of the driving signal DQ, a Q value of the vibrator 10 is high, but a Q value of the above-described peripheral member is low. Therefore, in a case where driving using the driving signal DQ stops in the non-driving period, an oscillation operation of the vibrator 10 with a high Q value is continued, but a temporary resonance operation of the peripheral member with a low Q value is stopped. Thus, in the non-driving period, an unnecessary signal caused by the temporary resonance operation of the peripheral member disappears. As a result, the detection circuit 60 performs the detection process in the non-driving period when the unnecessary signal disappears, so as to perform a detection process by using a detection signal with a high S/N ratio, and thus it is possible to improve the detection performance of the detection circuit 60.

In addition, in the non-driving period of the intermittent driving, the detection circuit 60 may start the detection process, for example, after at least one clock period has elapsed in clocks of a driving frequency (for example, 50 to 150 KHz) from a starting point of the non-driving period. For example, there is a probability that the resonance operation of the peripheral member is not stopped yet at the starting point of the non-driving period. However, it is expected that a Q value of the peripheral member at the driving frequency is very low. Therefore, if the detection process is performed after at least one clock period has elapsed from a starting point of the non-driving period, it is possible to perform a detection process which avoids an unnecessary signal caused by the resonance operation of the peripheral member.

In addition, in a case of performing a detection process in the non-driving period of the intermittent driving, an operation of the detection circuit 60 in the driving period causes wasteful power consumption. Therefore, in the driving period, the synchronous detection operation of the synchronous detection circuit 81 or the A/D conversion operation of the A/D conversion circuit 100 is stopped. Thus, in the driving period when the detection process is not performed, the operation of the synchronous detection circuit 81 or the A/D conversion circuit 100 is stopped, and thus wasteful power consumption is suppressed, thereby achieving low power consumption. Further, if the detection process is performed by operating the synchronous detection circuit 81 or the A/D conversion circuit 100 in the non-driving period after the driving period, it is possible to perform an appropriate detection process of a desired signal.

It is not necessary to maintain the oscillation loop in the non-driving period of the intermittent driving, and power consumption in the circuits forming the oscillation loop is useless. Therefore, in the non-driving period, operations of at least some circuits (for example, the integrator or the like) of the gain control circuit 40 are stopped. In addition, driving of the driving signal output circuit 50 is also stopped. On the other hand, in the non-driving period, an operation of the amplification circuit 32 is not stopped.

As mentioned above, in the non-driving period, an operation of the gain control circuit 40 is stopped so as to prevent wasteful power consumption. In addition, if an operation of the gain control circuit 40 stops, a path of the AGC loop is disconnected, but since the AGC loop is not required to be maintained in the non-driving period, there is no problem. On the other hand, since the detection circuit 60 performs the detection process as described above in the non-driving period, it is necessary to supply the synchronization signal SYC. For this reason, in the non-driving period, the amplification circuit 32 is operated without stopping, and thus the signal DV from the amplification circuit 32 is supplied to the synchronization signal output circuit 52. Accordingly, the synchronization signal output circuit 52 can supply the synchronization signal SYC which is obtained by binarizing the signal DV, to the detection circuit 60. Therefore, the detection circuit 60 can perform the detection process in the non-driving period by using the synchronization signal SYC.

In FIG. 3, when the lengths of the driving period and the non-driving period are respectively set to T1 and T2, the intermittent driving is performed so that, for example, T1 is the same as T2. The lengths T1 and T2 of the driving period and the non-driving period may be set to arbitrary lengths by using the period setting register 154 of FIG. 2.

For example, if the intermittent driving is performed, a substantial driving time is shortened, and thus there is a concern that detection sensitivity of a desired signal may be reduced. On the other hand, if the detection circuit 60 performs the detection process only in the non-driving period without performing the detection process in the driving period, there is a concern that detection efficiency may be reduced. Particularly, in a case where a delta-sigma method is employed in the A/D conversion circuit 100, detection efficiency is reduced due to a reduction in a detection time. As in FIG. 3, if the lengths T1 and T2 of the driving period and the non-driving period are set to T1=T2, biases such as the reductions in the sensitivity and detection efficiency are removed, thereby maintaining balance.

On the other hand, in a case of circumstances of prioritizing the sensitivity to the detection efficiency, T1>T2 may be set, and in a case of circumstances of prioritizing the detection efficiency to the sensitivity, T1<T2 may be set. If the period setting register 154 as illustrated in FIG. 2 is provided, T1 and T2 can be set to any values, and thus the above-described various circumstances can be handled.

In FIG. 2, the mode switching register 152 is provided, and thus it is possible to perform switching between an intermittent driving mode in which the intermittent driving is performed and a normal driving mode in which the normal driving is performed on the basis of the setting of the mode switching register 152. The normal driving is driving in which only the driving period continues without the non-driving period. For example, in a case of circumstances in which an influence of resonance of TAB or a package is small, or a decrease in sensitivity or a reduction in detection efficiency is not preferable, a driving mode may be set to the normal driving mode by the mode switching register 152. On the other hand, in a case of circumstances of prioritizing a reduction in an unnecessary signal or the like or low power consumption to a decrease in sensitivity or a reduction in detection efficiency, a driving mode may be set to the intermittent driving mode by the mode switching register 152. In this way, various circumstances can be handled.

In addition, if the intermittent driving is performed as illustrated in FIG. 3, a signal of a repetition frequency of the driving period and the non-driving period looks like a modulation signal of detection signal, and thus there is a concern that the modulation signal may be detected in the detection circuit 60. For example, if the repetition frequency of the driving period and the non-driving period is a frequency of several tens of Hz, the frequency overlaps a frequency band of a desired signal, and thus detection performance of the desired signal deteriorates.

For example, a low-pass filter (for example, a filter provided in the previous stage of the A/D conversion circuit or a digital filter of a DSP unit) having a frequency characteristic which allows a desired signal to pass therethrough and an unnecessary signal to be attenuated (blocked), is provided in the detection circuit 60. In addition, the repetition frequency of the driving period and the non-driving period overlaps a frequency band of a desired signal, the desired signal cannot be separated using the low-pass filter, and thus the detection performance of the desired signal deteriorates.

Accordingly, when a cutoff frequency of the low-pass filter is fc, and the lengths of the driving period and the non-driving period are respectively T1 and T2, 1/(T1+T2)>fc is preferably set. In other words, the repetition frequency of the driving period and the non-driving period is set to a frequency which is considerably higher than the cutoff frequency fc of the low-pass filter. For example, in a case where the cutoff frequency fc of the low-pass filter is 10 Hz to several tens of Hz, the repetition frequency indicated by 1/(T1+T2) is set to, for example, about 1 KHz to several KHz. Thus, it is possible to prevent a situation in which the detection performance of a desired signal deteriorates due to the repetition frequency of the driving period and the non-driving period in the intermittent driving.

4. Specific Configuration and Operation of Driving Circuit

Figure 4:
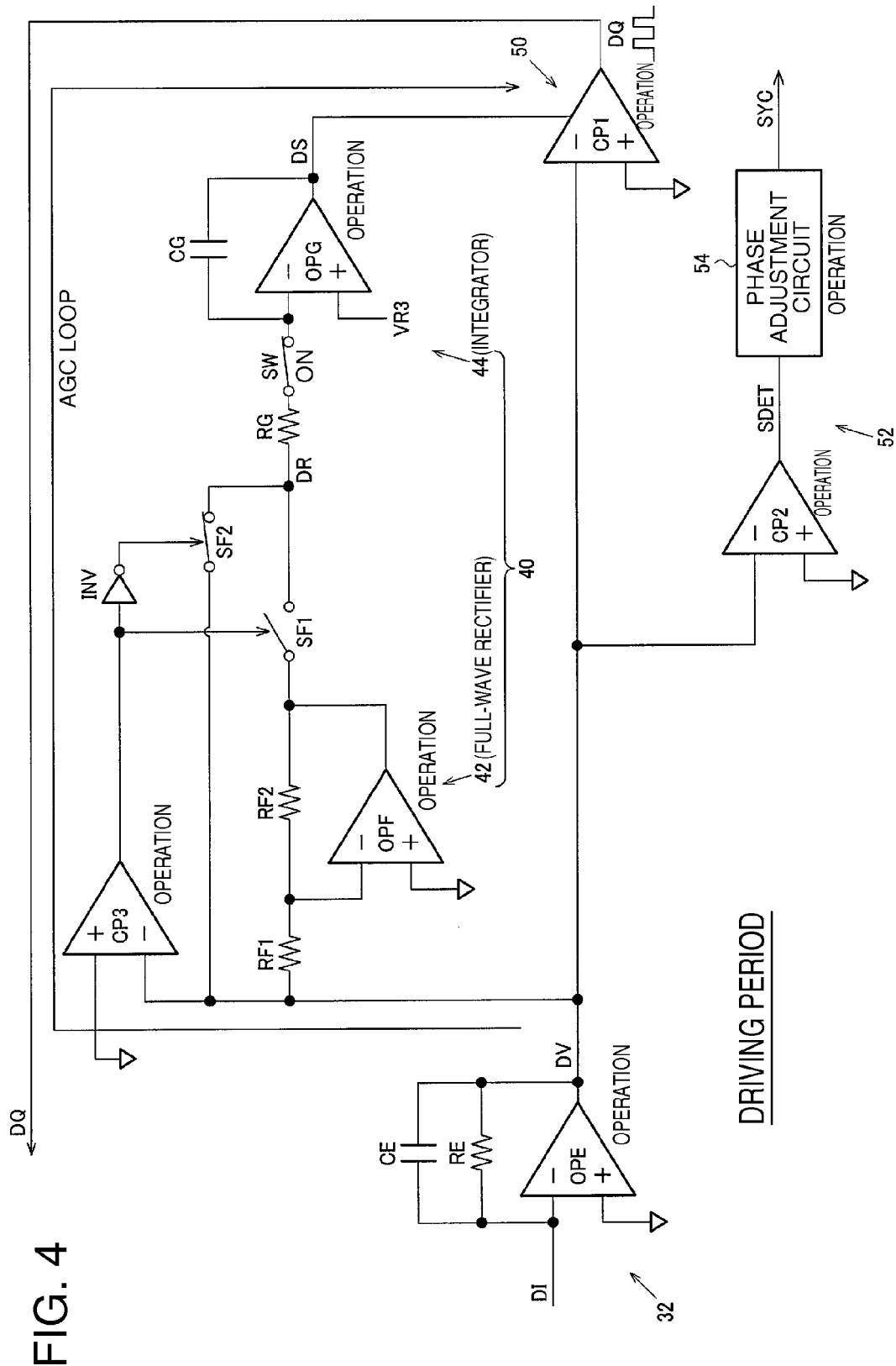
FIG. 4 is a diagram illustrating a specific configuration and operation of a driving circuit.
Figure 5:
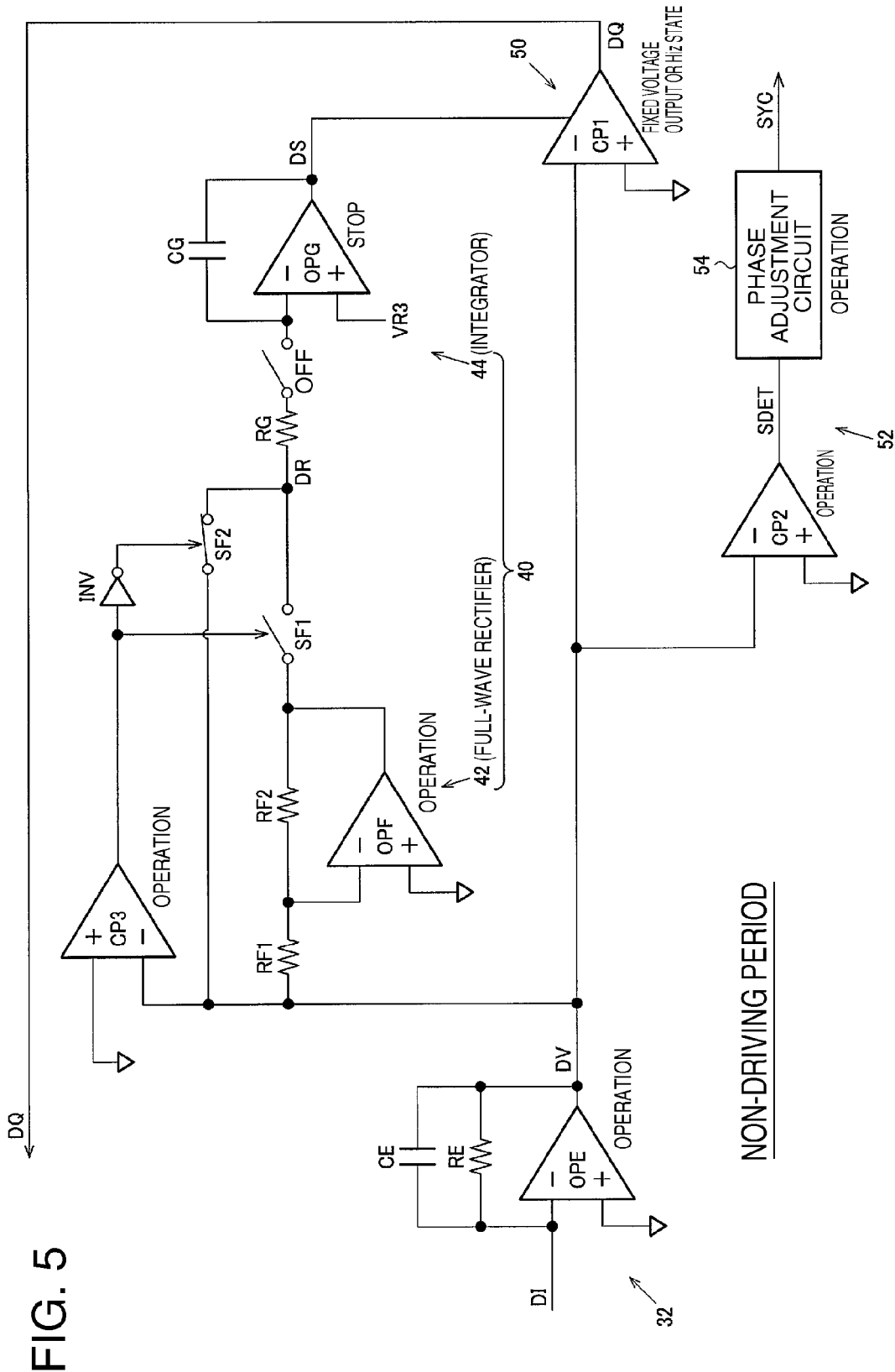
FIG. 5 is a diagram illustrating a specific configuration and operation of the driving circuit.

FIGS. 4 and 5 are diagrams illustrating a specific configuration and operation of the driving circuit 30.

In FIG. 4, the amplification circuit 32 is an integral current-voltage conversion circuit having a low-pass filter characteristic, and includes an operational amplifier OPE, a capacitor CE, and a resistive element RE. A non-inverting input terminal (first input terminal) of the operational amplifier OPE is set to a predetermined potential (for example, AGND), and the signal DI from the vibrator 10 is input to an inverting input terminal (second input terminal). The capacitor CE and the resistive element RE are provided between an output node of the amplification circuit 32 and a node of the inverting input terminal of the operational amplifier OPE.

The gain control circuit 40 (AGC) is a circuit which automatically adjusts a gain so that the loop gain is 1 in an oscillation steady state, and includes a full-wave rectifier 42 and an integrator 44. In addition, the gain control circuit 40 may include an oscillation detector which detects an oscillation state.

The full-wave rectifier 42 is a circuit which full-wave rectifies the output signal DV of the amplification circuit 32, and includes an operational amplifier OPF, resistive elements RF1 and RF2, a comparator CP3, switching elements SF1 and SF2, and an inverter circuit INV.

The resistive element RF1 is provided between the node of the signal DV and a node of an inverting input terminal of the operational amplifier OPF, and the resistive element RF2 is provided between an output node of the operational amplifier OPF and the node of the inverting input terminal thereof.

The switching element SF1 is provided between the output node of the operational amplifier OPF and an input node of the integrator 44, and the switching element SF2 is provided between the node of the signal DV and the input node of the integrator 44. In addition, the switching elements SF1 and SF2 are controlled so as to be exclusively turned on or off on the basis of an output signal of the comparator CP3 which compares a voltage of the signal DV with a voltage of a predetermined potential. Accordingly, a signal DR is obtained by full-wave rectifying the signal DV.

The integrator 44 is a circuit which performs an integral process on the signal DR which is full-wave rectified by the full-wave rectifier 42, and includes an operational amplifier OPG, a resistive element RG, and a capacitor CG. A non-inverting input terminal of the operational amplifier OPG is set to a predetermined voltage VR3. The resistive element RG is provided between the input node of the integrator 44 and a node of an inverting input terminal of the operational amplifier OPG, and the capacitor CG is provided between an output node of the operational amplifier OPG and a node of the inverting input terminal thereof. An output signal of the integrator 44 which is an output signal of the gain control circuit 40 is the control voltage DS, and is supplied to a comparator CP1 of the driving signal output circuit 50.

The comparator CP1 forming the driving signal output circuit 50 has a non-inverting input terminal which is set to a predetermined potential (for example, AGND), and an inverting input terminal to which the signal DV from the amplification circuit 32 is input. In addition, the rectangular wave driving signal DQ obtained by binarizing the signal DV is output. Even if the rectangular wave driving signal DQ is output to the vibrator 10, unnecessary harmonic waves are reduced by a frequency filter operation of the vibrator 10, and thus a driving signal of an aimed frequency (resonance frequency) can be obtained. The comparator CP1 includes a differential portion and an output portion connected to the differential portion. Further, the control voltage DS from the gain control circuit 40 (integrator) is supplied as a power supply voltage (a high potential side power supply voltage) of the output portion of the comparator CP1. Accordingly, an amplitude of the driving signal DQ output from the comparator CP1 is changed in response to the control voltage DS of the gain control circuit 40, and thus gain control is realized so that the loop gain is 1 in the oscillation steady state. Furthermore, the driving signal output circuit 50 may be a circuit which outputs a sinusoidal driving signal DQ instead of the rectangular wave driving signal.

The synchronization signal output circuit 52 includes a comparator CP2 and a phase adjustment circuit 54 (phase shifter). The comparator CP2 has a non-inverting input terminal which is set to a predetermined potential (for example, AGND) and an inverting input terminal to which the signal DV from the amplification circuit 32 is input. In addition, a signal SDET obtained by binarizing the signal DV is output. The phase adjustment circuit 54 adjusts a phase of the signal SDET so that synchronous detection in a switching mixer 80 is appropriately performed, and outputs the signal SDET to the switching mixer 80 of the detection circuit 60 as the synchronization signal SYC.

In addition, a configuration of the driving circuit 30 is not limited to the configuration of FIG. 4, and may have various modifications. For example, in FIG. 4, the driving signal output circuit 50 is formed by the comparator CP1 which outputs the rectangular wave driving signal DQ, but the driving signal output circuit 50 may be formed by a gain amplifier which outputs a sinusoidal driving signal DQ. In this case, an amplitude of the driving signal DQ may be controlled by controlling a gain of the gain amplifier on the basis of the control voltage DS from the gain control circuit 40. Further, in FIG. 4, the comparator CP1 of the driving signal output circuit 50 and the comparator CP2 of the synchronization signal output circuit 52 are illustrated as separate circuits, but are not limited thereto. For example, a composite comparator may be used in which the comparators CP1 and CP2 share a differential portion thereof.

FIG. 4 is a diagram illustrating a state of the driving circuit 30 in the driving period of the intermittent driving, and FIG. 5 is a diagram illustrating a state of the driving circuit 30 in the non-driving period of the intermittent driving. As illustrated in FIGS. 4 and 5, a switching element SW is provided between one end of the resistive element RG of the integrator 44 and the node of the inverting input terminal of the operational amplifier OPG.

As illustrated in FIG. 4, in the driving period, the switching element SW is turned on. Accordingly, the AGC loop is formed by the gain control circuit 40. In addition, the comparator CP1 of the driving signal output circuit 50 outputs the rectangular wave driving signal DQ whose amplitude is controlled by the AGC loop of the gain control circuit 40.

On the other hand, as illustrated in FIG. 5, in the non-driving period, the switching element SW is turned off, and the AGC loop is disconnected. In addition, the comparator CP1 of the driving signal output circuit 50 outputs a fixed voltage, or the output node thereof is set to a high impedance state. Accordingly, the intermittent driving in which the driving period and the non-driving period are repeated is realized as illustrated in FIG. 3.

In addition, in FIGS. 4 and 5, the switching element SW is provided to control to be turned on and off on the basis of the driving period and the non-driving period, but the switching element SW is not necessarily required to be provided. For example, without providing the switching element SW, the integrator 44 may be operated in the driving period of FIG. 4, and an operation current may be stopped so as to stop an operation of the integrator 44 in the non-driving period of FIG. 5, thereby realizing the intermittent driving.

As illustrated in FIG. 4, in the driving period, the amplification circuit 32, the gain control circuit 40, the driving signal output circuit 50, and the synchronization signal output circuit 52 are set to an operation state. On the other hand, as illustrated in FIG. 5, in the non-driving period, the amplification circuit 32 is set to an operation state, but the integrator 44 which is apart of the gain control circuit 40 is set to a stop state.

In the non-driving period of FIG. 5, the driving signal output circuit 50 stops outputting of the rectangular wave driving signal DQ, but the synchronization signal output circuit 52 is set to an operation state so as to output the rectangular wave synchronization signal SYC to the detection circuit 60. In addition, in FIG. 5, the full-wave rectifier 42 is set to an operation state, but may be set to a stop state.

FIGS. 6A to 6C are diagrams illustrating a configuration and operation of an output portion of the comparator CP1 of the driving signal output circuit 50. The comparator CP1 includes a differential portion to which the signal DV and a predetermined potential (AGND) are input, and an output portion connected to the differential portion. The output portion has, as illustrated in FIGS. 6A to 6C, a P type transistor TA1, an N type transistor TA2, and switching elements SA1 to SA5.

The transistors TA1 and TA2 are connected in series between a supply node of the control voltage DS and a supply node of the predetermined potential (AGND). The switching element SA1 is provided between an input node of an output signal DFQ of the differential portion of the comparator CP1 and a gate node of the transistor TA1. The switching element SA2 is provided between the input node of the output signal DFQ of the differential portion and a gate node of the transistor TA2. The switching element SA3 is provided between the supply node of the control voltage DS and the gate node of the transistor TA1. The switching element SA4 is provided between the supply node of the predetermined potential and the gate node of the transistor TA2. The switching element SA5 is provided between an output node of the driving signal DQ of the output portion and the supply node of the predetermined potential.

In a normal period such as the driving period of FIG. 4, as illustrated in FIG. 6A, the switching elements SA1 and SA2 are turned on, and the switching elements SA3, SA4 and SA5 are turned off. Accordingly, the output signal DFQ from the differential portion is buffered by the output portion, and thus the rectangular wave driving signal DQ is output.

On the other hand, in a case where a fixed voltage is output in the non-driving period, as illustrated in FIG. 6B, the switching elements SA1 and SA2 are turned off, and the switching elements SA3, SA4 and SA5 are turned on. The switching elements SA3 and SA4 are turned on, and thus transistors TA1 and TA2 are turned off. In addition, the switching element SA5 is turned on, and thus the output node of the output portion is set to a fixed potential (for example, AGND) so that the driving signal output circuit 50 outputs a fixed voltage.

In a case where a high impedance state is set in the non-driving period, as illustrated in FIG. 6C, the switching elements SA1, SA2 and SA5 are turned off, and the switching elements SA3 and SA4 are turned on. The switching elements SA3 and SA4 are turned on, and thus the transistors TA1 and TA2 are turned off. Accordingly, the output node of the output portion which is an output node of the driving signal output circuit 50 is set to a high impedance state.

Figure 8:
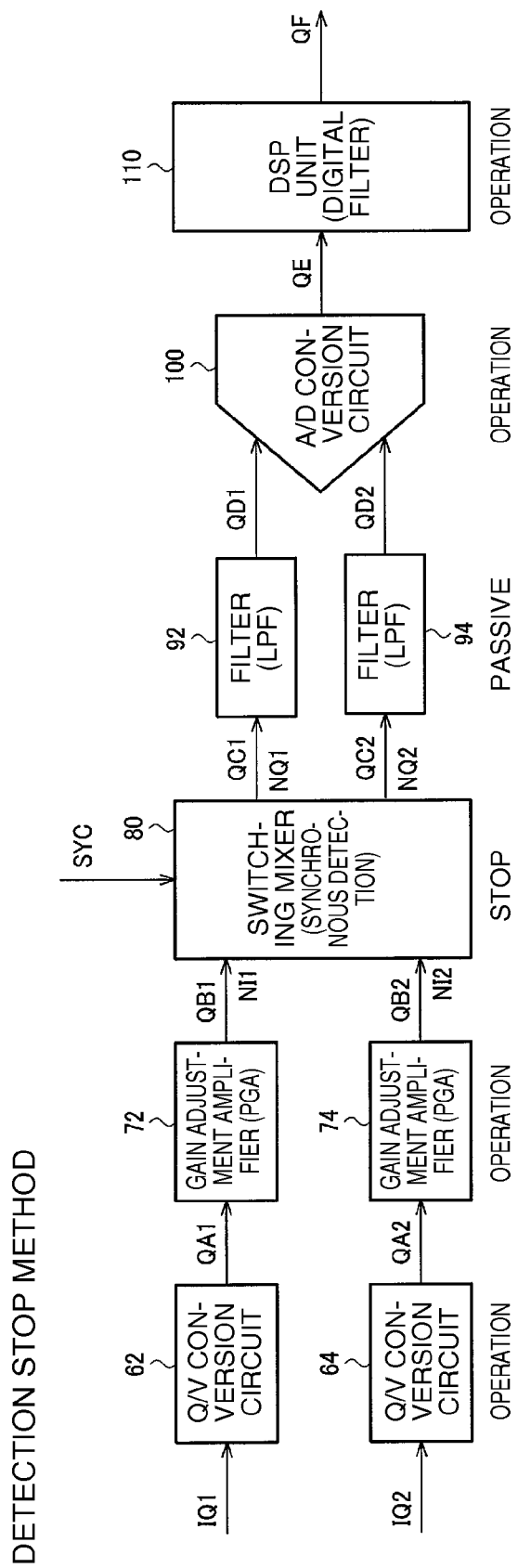
FIG. 8 is a diagram illustrating a configuration and operation of the full differential switching mixer type detection circuit.

5. Configurations and Operations of Detection Circuit of Various Detection Types Next, configurations and operations of the detection circuit 60 of various detection types will be described. FIGS. 7A, 7B and 8 are diagrams illustrating a configuration and diagram of a full differential switching mixer type detection circuit 60.

As illustrated in FIG. 7A, the full differential switching mixer type detection circuit 60 includes first and second Q/V conversion circuits 62 and 64, first and second gain adjustment amplifiers 72 and 74, the switching mixer 80, first and second filters 92 and 94, the A/D conversion circuit 100, and a DSP unit 110 (digital signal processing unit).

The first and second detection signals IQ1 and IQ2 which are differential signals from the vibrator 10 are input to the Q/V conversion circuits 62 and 64 (electric charge-voltage conversion circuits) as an example of a current-voltage conversion circuit. In addition, the Q/V conversion circuits 62 and 64 convert electric charge (current) generated in the vibrator 10 into voltages. The Q/V conversion circuits 62 and 64 are continuous type electric charge-voltage conversion circuits having feedback resistors.

The gain adjustment amplifiers 72 and 74 adjust gains of the output signals QA1 and QA2 of the Q/V conversion circuits 62 and 64 so as to amplify the signals. The gain adjustment amplifiers 72 and 74 are so-called programmable gain amplifiers, and amplifies the signals QA1 and QA2 with gains set by a control circuit (not illustrated). For example, the amplification to a signal having an amplitude suitable for a voltage conversion range of the A/D conversion circuit 100 is performed.

The switching mixer 80 is a mixer which performs differential synchronous detection on the basis of the synchronization signal SYC from the driving circuit 30. Specifically, in the switching mixer 80, an output signal QB1 of the gain adjustment amplifier 72 is input to a first input node NI1, and an output signal QB2 of the gain adjustment amplifier 74 is input to a second input node NI2. In addition, the differential synchronous detection is performed using the synchronization signal SYC from the driving circuit 30, and differential first and second output signals QC1 and QC2 are respectively to output to first and second output nodes NQ1 and NQ2. In the switching mixer 80, an unnecessary signal such as noise (1/f noise) generated by the previous-stage circuits (the Q/V conversion circuits and the gain adjustment amplifiers) is frequency-converted to have a high frequency band. In addition, a desired signal which is a signal corresponding to the Coriolis force is dropped down to a DC signal.

The first output signal QC1 from the first output node NQ1 of the switching mixer 80 is input to the filter 92. The second output signal QC2 from the second output node NQ2 of the switching mixer 80 is input to the filter 94. The filters 92 and 94 are, for example, low-pass filters having frequency characteristics which remove (attenuate) an unnecessary signal and allow a desired signal to pass therethrough. For example, the unnecessary signal such as 1/f noise which has been converted to have a high frequency band by the switching mixer 80 is removed by the filters 92 and 94. In addition, the filters 92 and 94 are passive filters formed by, for example, passive elements. In other words, passive filters formed by passive elements such as resistive elements or capacitors without using operational amplifiers may be employed as the filters 92 and 94.

The A/D conversion circuit 100 receives an output signal QD1 from the filter 92 and an output signal QD2 from the filter 94 so as to perform differential A/D conversion. Specifically, the A/D conversion circuit 100 performs the A/D conversion by sampling the output signals QD1 and QD2 with the filters 92 and 94 as anti-aliasing filters (prefilters). In addition, in the present embodiment, the output signal QD1 from the filter 92 and the output signal QD2 from the filter 94 are input to the A/D conversion circuit 100 without using active elements.

As the A/D conversion circuit 100, A/D conversion circuits of various types such as, for example, a delta-sigma type or a successive comparison type can be employed. In a case of employing the delta-sigma type, an A/D conversion circuit may be used which has, for example, a correlated double sampling (CDS) or chopper function for reducing 1/f noise, and is formed by, for example, a second-order delta-sigma modulator, or the like. In addition, in a case of employing a successive comparison type, an A/D conversion circuit may be used which has, for example, a dynamic element matching (DEM) function or the like for suppressing deterioration in an S/N ratio due to DAC element variations, and is formed by capacitance DACs and successive comparison control logics.

The digital signal processing (DSP) unit 110 performs various digital signal processes. For example, the DSP unit 110 performs, for example, a digital filter process for limiting a band based on an application of a desired signal, or a digital filter process for removing noise generated by the A/D conversion circuit 100 or the like. In addition, digital correction processes such as gain correction (sensitivity adjustment) and offset correction are performed.

The detection circuit 60 of FIG. 7A employs the full differential switching mixer type. In other words, the differential detection signals IQ1 and IQ2 from the vibrator 10 undergo signal amplification and gain adjustment in the Q/V conversion circuits 62 and 64, and the gain adjustment amplifiers 72 and 74, and are input to the switching mixer 80 as the differential signals QB1 and QB2. The switching mixer performs the synchronous detection process on the differential signals QB1 and QB2 so that an unnecessary signal is frequency-converted to have a high frequency band. In addition, the unnecessary signal which is frequency-converted to have a high frequency band is removed by the filters 92 and 94, and the differential signals QD1 and QD2 are input to the A/D conversion circuit 100 so as to undergo differential A/D conversion.

According to the full differential switching mixer type detection circuit 60, the 1/f noise or the like generated in the Q/V conversion circuits 62 and 64 and the gain adjustment amplifiers 72 and 74 is removed by the frequency conversion in the switching mixer 80 and the low-pass filter characteristics of the filters 92 and 94. In addition, the switching mixer 80 which cannot earn a gain but generates less noise (1/f noise does not occur) and the filters 92 and 94 formed by low-noise passive elements are provided between the gain adjustment amplifiers 72 and 74 and the A/D conversion circuit 100. Therefore, the noise generated by the Q/V conversion circuits 62 and 64 or the gain adjustment amplifiers 72 and 74 is removed, and noise generated by the switching mixer 80 or the filters 92 and 94 is minimized, and thus the signals QD1 and QD2 in a low noise state are input to the A/D conversion circuit 100 and undergo A/D conversion. Further, the signals QD1 and QD2 can be A/D converted as differential signals, and thus it is possible to further improve an S/N ratio than in a case of A/D conversion as a single-end signal.

In addition, as described above, in the present embodiment, the detection circuit 60 performs a detection process in the non-driving period of the intermittent driving, and, on the other hand, at least some circuits of the detection circuit 60 stop an operation in the driving period. Thereby, low power consumption is realized.

For example, in all-stop method of FIG. 7A, all the circuits of the detection circuit 60 stop operations in the driving period of the intermittent driving. In other words, operations of all of the Q/V conversion circuits 62 and 64, the gain adjustment amplifiers 72 and 74, the switching mixer 80, the A/D conversion circuit 100, and the DSP unit 110 are stopped. According to this all-stop method, power consumption of the detection circuit 60 becomes the minimum in the driving period, and a power consumption reduction effect is the greatest. In addition, the stopping of operations of the circuits may be performed by, for example, stopping the supply of clocks, or turning operation currents of the analog circuits to an Off state.

On the other hand, in an ADC stop method of FIG. 7B, operations of the A/D conversion circuit 100 and the DSP unit 110 are stopped in the driving period of the intermittent driving. In addition, the Q/V conversion circuits 62 and 64, the gain adjustment amplifiers 72 and 74, and the switching mixer 80 continue their operations even in the driving period. For example, there is a case where, if operations of the Q/V conversion circuits 62 and 64 and the gain adjustment amplifiers 72 and 74 which are analog circuits are temporarily stopped, a long time is required to return to a stable operation state. Therefore, in this case, the method of FIG. 7B is preferable although the power consumption reduction effect is smaller than in the all-stop method of FIG. 7A. In other words, when the driving period is changed to the non-driving period, and the detection circuit 60 starts the detection process, the analog circuits such as the Q/V conversion circuits 62 and 64 are in a stable operation state, and thus the detection process can be immediately started. In addition, in FIG. 7B, an operation of the switching mixer 80 may be stopped.

In addition, in a detection stop method of FIG. 8, only the switching mixer 80 stops an operation in the driving period of the intermittent driving. For example, in the driving period, the supply of the synchronization signal SYC to the switching mixer 80 is stopped (for example, a voltage level of the synchronization signal SYC is fixed to an L level), and thus an operation of the switching mixer 80 is stopped. Further, the Q/V conversion circuits 62 and 64, the gain adjustment amplifiers 72 and 74, the A/D conversion circuit 100, and the DSP unit 110 continue their operations even in the driving period. Thus, even in a case where a long time is required to return to a stable operation state after an operation is stopped, the A/D conversion circuit 100 or the DSP unit 110 can handle this case. In other words, when the driving period is changed from the driving period to the non-driving period, and the detection circuit 60 starts the detection process, the A/D conversion circuit 100 is in a stable operation state, and thus the detection process can be immediately started. On the other hand, the switching mixer 80 is formed by switching elements as described later, and thus does not have an analog circuit such as an operational amplifier. Therefore, when the driving period is changed from the driving period to the non-driving period, and the detection circuit 60 starts the detection process, the switching mixer 80 can immediately start a stable synchronous detection operation.

FIGS. 9A to 9C are diagrams illustrating a configuration and operation of a direct sampling type detection circuit 60.

The direct sampling type detection circuit 60 includes a discrete Q/V conversion circuit 260, an A/D conversion circuit 270, and a DSP unit 280. The direct sampling type provides the best configuration from the viewpoint of achieving a small circuit scale. However, there is a problem in that there is no anti-aliasing filter in the previous stage of the A/D conversion circuit 270, and thus performance deterioration due to aliasing noise cannot be avoided. In addition, there is a problem in that, if current consumption is increased for achieving low noise in the discrete Q/V conversion circuit 260, a frequency band is expanded, which results in an increase in aliasing noise, and thus it is hard to achieve low noise. In contrast, in the full differential switching mixer type of FIG. 7A, since the Q/V conversion circuits 62 and 64 are continuous type electric charge-voltage conversion circuits having feedback resistive elements, it is possible to prevent the performance deterioration problem due to the aliasing noise, occurring in the direct sampling method, and thus there is an advantage in which the detection process can be performed at low noise with a small-scale circuit configuration.

Also in a stop method of the direct sampling type detection circuit 60, there are an all-stop method of FIG. 9A, an ADC stop method of FIG. 9B, and a detection stop method of FIG. 9C.

For example, in the all-stop method of FIG. 9A, all of the discrete Q/V conversion circuit 260, the A/D conversion circuit 270, and the DSP unit 280 stop their operations in the driving period of the intermittent driving. Accordingly, power consumption of the detection circuit 60 becomes the minimum in the driving period, and a power consumption reduction effect is the greatest.

On the other hand, in the ADC stop method of FIG. 9B, in the driving period of the intermittent driving, operations of the A/D conversion circuit 270 and the DSP unit 280 are stopped, and the discrete Q/V conversion circuit 260 continues its operation. Accordingly, when the driving period is changed to the non-driving period, and the detection circuit 60 starts the detection process, the discrete Q/V conversion circuit 260 is in a stable operation state, and thus the detection process can be immediately started.

In the detection stop method of FIG. 9C, only the discrete Q/V conversion circuit 260 stops its operation in the driving period of the intermittent driving. In addition, in the driving period, the A/D conversion circuit 270 and the DSP unit 280 continue their operations. Thus, even in a case where a long time is required to return to a stable operation state after an operation is stopped, the A/D conversion circuit 270 or the DSP unit 280 can handle this case.

Figure 11:
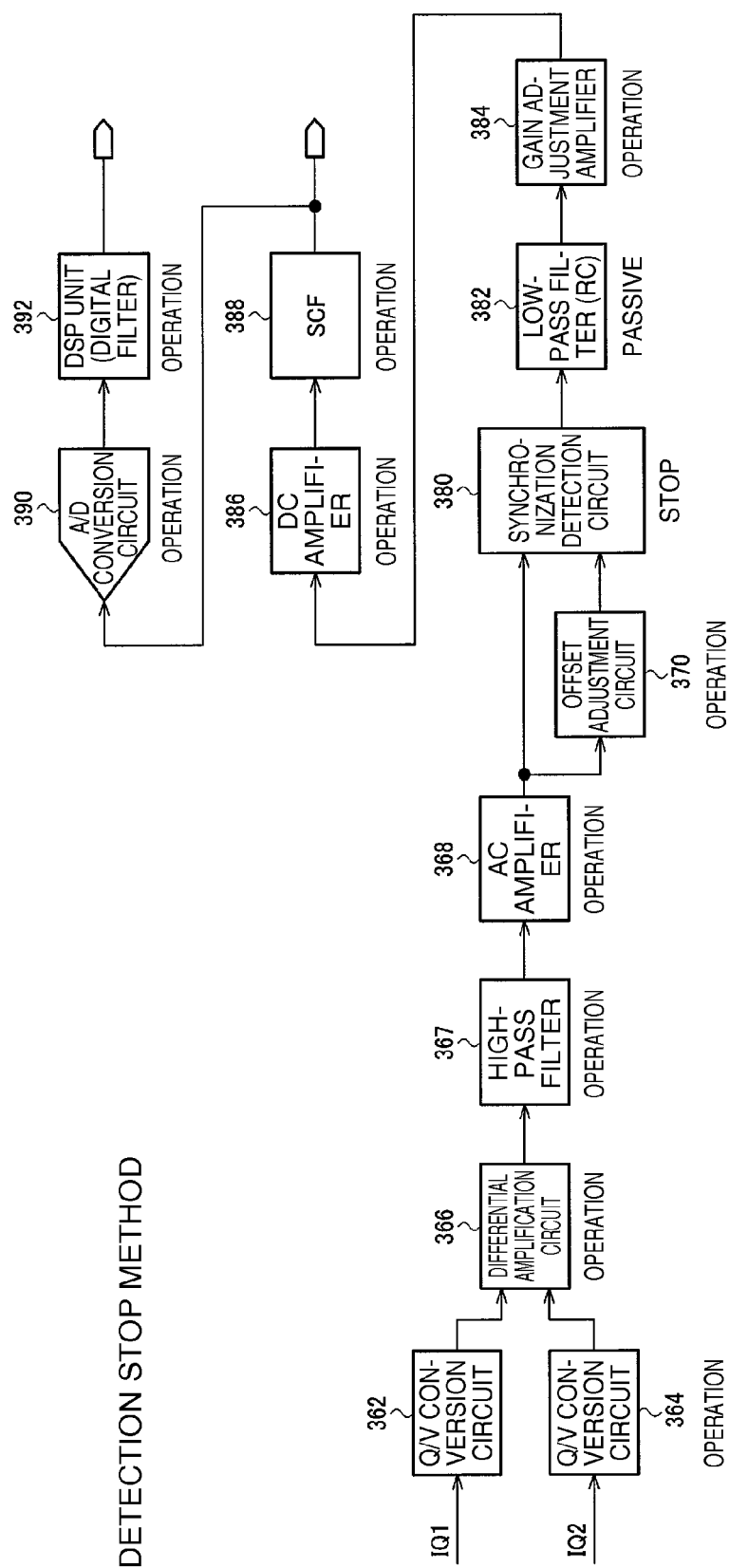
FIG. 11 is a diagram illustrating a configuration and operation of the analog gyro type detection circuit.

FIGS. 10A, 10B and 11 are diagrams illustrating a configuration and operation of an analog synchronous detection type detection circuit 60.

The analog synchronous detection type detection circuit 60 includes Q/V conversion circuits 362 and 364, a differential amplification circuit 366, a high-pass filter 367, an AC amplifier 368, an offset adjustment circuit 370, a synchronous detection circuit 380, a low-pass filter 382, a gain adjustment amplifier 384, a DC amplifier 386, and an SCF 388 (switched capacitor filter). In addition, for example, an A/D conversion circuit 390 and a DSP unit 392 (digital filter) which are externally attached to the detection circuit 60 are provided.

The analog synchronous detection type has an advantage in that, for example, a high gain of a signal is taken in the detection circuit 60, and thus noise characteristics can be improved. However, there is a problem in that the number of circuit blocks increases, and thus the circuits have a large scale, or in that there are many analog circuit blocks which consume a large amount of current, which leads to wasteful power consumption, and thus power consumption is excessive. In contrast, the full differential switching mixer type of FIG. 7A has an advantage in that the number of circuit blocks is smaller than in the analog synchronous detection type, and it is possible to easily achieve a small circuit scale and reduce power consumption. In the full differential switching mixer type, the differential signals IQ1 and IQ2 from the vibrator are subject to the gain adjustment, the synchronous detection process, and the filter process, in a differential signal state, and are input to the A/D conversion circuit 100 so as to undergo the A/D conversion. For this reason, the full differential switching mixer type provides an advantageous configuration in terms of noise reduction as compared with the analog synchronous detection type in which the filter process, the synchronous detection process, the gain adjustment process, and the like are performed in a single-end signal state. For example, in the analog synchronous detection type, a first signal with a single end from the AC amplifier 368 is inverted using an inverting amplifier in the previous stage of the synchronous detection circuit 380, thereby generating a second signal, and synchronous detection is performed using the first and second signals. For this reason, noise of the first signal is not equivalent to noise of the second signal, and, even if frequency conversion is performed in the synchronous detection circuit 380, noise or the like of the inverting amplifier remains. In contrast, in the full differential switching mixer type, such remaining noise or the like of the inverting amplifier does not occur, and thus it is possible to improve an S/N ratio.

Also in a stop method of the analog synchronous detection type detection circuit 60, there are an all-stop method of FIG. 10A, an ADC stop method of FIG. 10B, and a detection stop method of FIG. 11.

For example, in the all-stop method of FIG. 10A, all the circuits of the detection circuit 60 stop their operations in the driving period of the intermittent driving. Accordingly, power consumption of the detection circuit 60 becomes the minimum in the driving period, and a power consumption reduction effect is the greatest.

On the other hand, in the ADC stop method of FIG. 10B, in the driving period of the intermittent driving, operations of the A/D conversion circuit 390 and the DSP unit 392 are stopped, and the other analog circuits continue their operations. Accordingly, when the driving period is changed to the non-driving period, and the detection circuit 60 starts the detection process, the analog circuits are in a stable operation state, and thus the detection process can be immediately started. In addition, in the driving period, the subsequent circuits including the synchronous detection circuit 380 may stop their operations.

In the detection stop method of FIG. 11, only the synchronous detection circuit 380 stops its operation in the driving period of the intermittent driving. For example, in the driving period, the supply of the synchronization signal SYC to the synchronous detection circuit 380 is stopped, and thus an operation of the synchronous detection circuit 380 is stopped. In addition, in the driving period, the other circuits continue their operations. Thus, even in a case where a long time is required to return to a stable operation state after an operation is stopped, this case can be handled.

6. Specific Configuration Example of Detection Circuit

Figure 12:
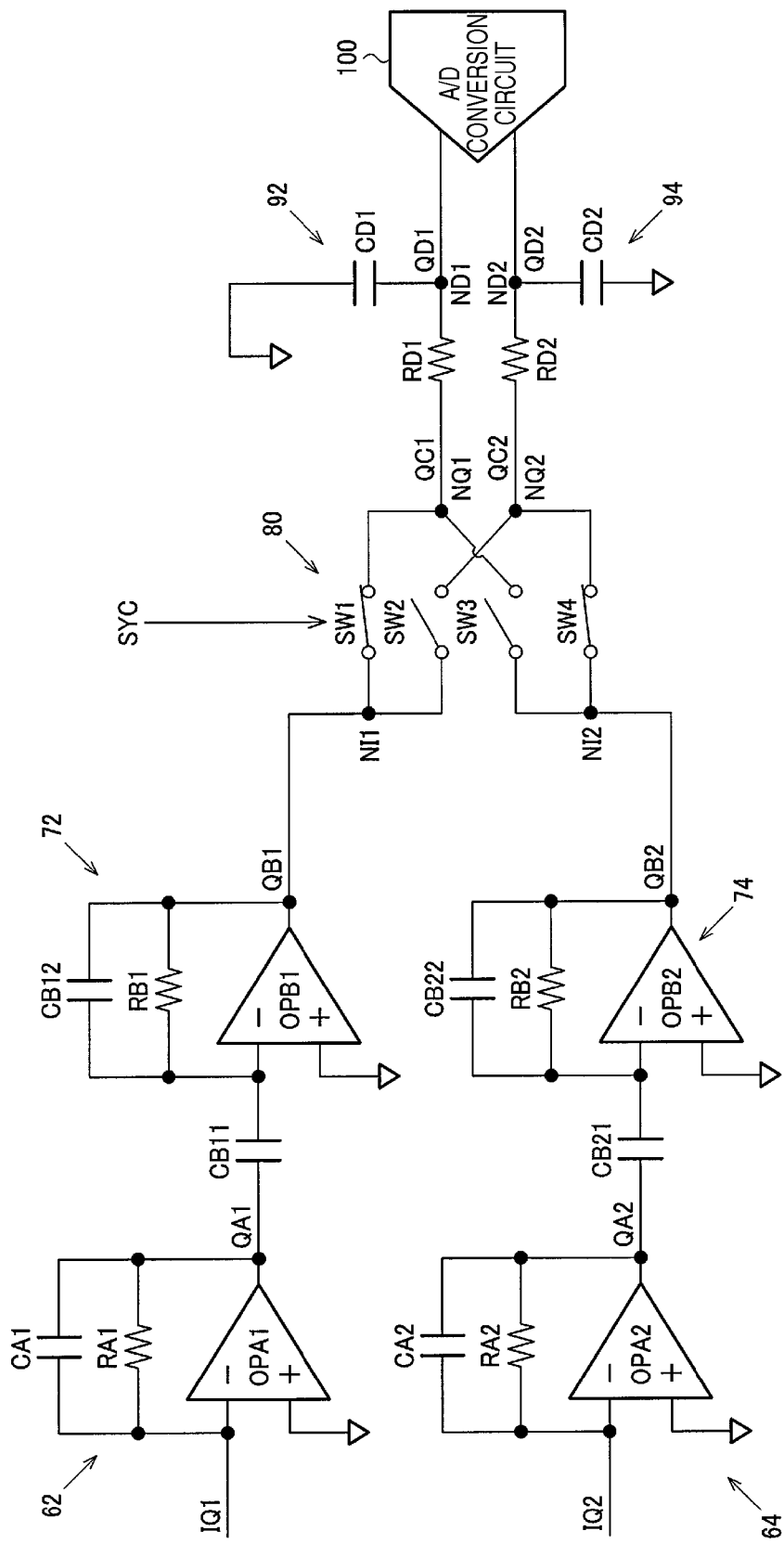
FIG. 12 is a diagram illustrating a specific first configuration example of the full differential switching mixer type detection circuit.

FIG. 12 illustrates a specific first configuration example of the full differential switching mixer type detection circuit 60 described in FIG. 7A.

The Q/V conversion circuit 62 includes an operational amplifier OPA1, a capacitor CA1, and a resistive element RA1, and the Q/V conversion circuit 64 includes an operational amplifier OPA2, a capacitor CA2, and a resistive element RA2.

The operational amplifier OPA1 of the Q/V conversion circuit 62 has a non-inverting input terminal (a first input terminal in a broad sense) which is set to a predetermined potential (AGND). The capacitor CA1 and the resistive element RA1 are provided between an output node of the Q/V conversion circuit 62 and a node of an inverting input terminal (a second input terminal in a broad sense) of the operational amplifier OPA1.

The operational amplifier OPA2 of the Q/V conversion circuit 64 has a non-inverting input terminal which is set to a predetermined potential. The capacitor CA2 and the resistive element RA2 are provided between an output node of the Q/V conversion circuit 64 and a node of an inverting input terminal of the operational amplifier OPA2.

Thus, the Q/V conversion circuits 62 and 64 of FIG. 12 are continuous type electric charge-voltage conversion circuits having the feedback resistive elements RA1 and RA2, and have an advantageous configuration in terms of noise reduction as compared with the direct sampling type discrete Q/V conversion circuit 260 of FIG. 9A.

The gain adjustment amplifier 72 includes an operational amplifier OPB1, first and second capacitors CB11 and CB12, and a resistive element RB1. The gain adjustment amplifier 74 includes an operational amplifier OPB2, first and second capacitors CB21 and CB22, and a resistive element RB2.

The operational amplifier OPB1 of the gain adjustment amplifier 72 has a non-inverting input terminal (a first input terminal in a broad sense) which is set to a predetermined potential (AGND). The capacitor CB11 is provided between an input node of the gain adjustment amplifier 72 and a node of an inverting input terminal (a second input terminal in a broad sense) of the operational amplifier OPB1. The capacitor CB12 and the resistive element RB1 are provided between an output node of the gain adjustment amplifier 72 and the node of the inverting input terminal of the operational amplifier OPB1.

The operational amplifier OPB2 of the gain adjustment amplifier 74 has a non-inverting input terminal which is set to a predetermined potential. The capacitor CB21 is provided between an input node of the gain adjustment amplifier 74 and a node of an inverting input terminal of the operational amplifier OPB2. The capacitor CB22 and the resistive element RB2 are provided between an output node of the gain adjustment amplifier 74 and the node of the inverting input terminal of the operational amplifier OPB2.

In the gain adjustment amplifier 72, at least one of the capacitors CB11 and CB12 is a capacitor whose capacitance value is variable. Also in the gain adjustment amplifier 74, at least one of the capacitors CB21 and CB22 is a capacitor whose capacitance value is variable. Capacitance values of the capacitors are set to be variable by a control circuit (register) (not illustrated). In addition, for example, when a capacitance value of the capacitors CB11 and CB21 is C1, and a capacitance value of the capacitors CB12 and CB22 is C2, gains of the gain adjustment amplifiers 72 and 74 are set by a capacitance ratio C2/C1 of C1 and C2.

The gain adjustment amplifiers 72 and 74 of FIG. 12 have frequency characteristics of a high-pass filter. In other words, a high-pass filter is formed by the capacitor CB11 and the resistive element RB1 of the gain adjustment amplifier 72, and a high-pass filter is formed by the capacitor CB21 and the resistive element RB2 of the gain adjustment amplifier 74. Accordingly, the gain adjustment amplifier 72 has frequency characteristics of the high-pass filter which reduces (removes) 1/f noise of the Q/V conversion circuit 62. In addition, the gain adjustment amplifier 74 has frequency characteristics of the high-pass filter which reduces (removes) 1/f noise of the Q/V conversion circuit 64.

The switching mixer 80 includes first to fourth switching elements SW1, SW2, SW3 and SW4. The switching element SW1 is provided between a first input node NI1 and a first output node NQ1 of the switching mixer 80. The switching element SW2 is provided between the first input node NI1 and a second output node NQ2 of the switching mixer 80. The switching element SW3 is provided between a second input node NI2 and the first output node NQ1 of the switching mixer 80. The switching element SW4 is provided between the second input node NI2 and the second output node NQ2 of the switching mixer 80. The switching elements SW1 to SW4 may be formed by, for example, MOS transistors (for example, NMOS type transistors or transfer gates).

In addition, on the basis of the synchronization signal SYC from the driving circuit 30, the switching elements SW1 and SW2 are exclusively turned on and off, and the switching elements SW3 and SW4 are exclusively turned on and off. For example, if the synchronization signal SYC is in an H level (first level), the switching elements SW1 and SW4 are turned on, and the switching elements SW2 and SW3 are turned off. On the other hand, if the synchronization signal SYC is in an L level (second level), the switching elements SW2 and SW3 are turned on, and the switching elements SW1 and SW4 are turned off. Accordingly, the differential signals QB1 and QB2 from the gain adjustment amplifiers 72 and 74 are synchronously detected in a differential signal state, and the synchronously detected signals are output as the differential signals QC1 and QC2. For example, in the analog synchronous detection type of FIG. 10A, the synchronous detection is performed in a single-end signal state, and thus a single-end signal is output, but, in the full differential switching mixer type of FIG. 12, the synchronous detection is performed in a differential signal state, and thus differential signals are output as synchronously detected signals.

The filter 92 has a resistive element RD1 and a capacitor CD1. The filter 94 has a resistive element RD2 and a capacitor CD2.

The resistive element RD1 of the filter 92 is provided between the output node NQ1 of the switching mixer 80 and a first connection node ND1. The first connection node ND1 is a node connected to the first input node of the A/D conversion circuit 100. The capacitor CD1 is provided between the first connection node ND1 and a node of a predetermined potential (for example, AGND).

The resistive element RD2 of the filter 94 is provided between the output node NQ2 of the switching mixer 80 and a second connection node ND2. The second connection node ND2 is a node connected to the second input node of the A/D conversion circuit 100. The capacitor CD2 is provided between the second connection node ND2 and a node of a predetermined potential (for example, AGND).

As mentioned above, the filters 92 and 94 are passive filters formed by passive elements such as resistive elements and capacitors. In addition, the output signal QD1 from the filter 92 and the output signal QD2 from the filter 94 are input to the A/D conversion circuit 100 without using active elements.

Figure 13:
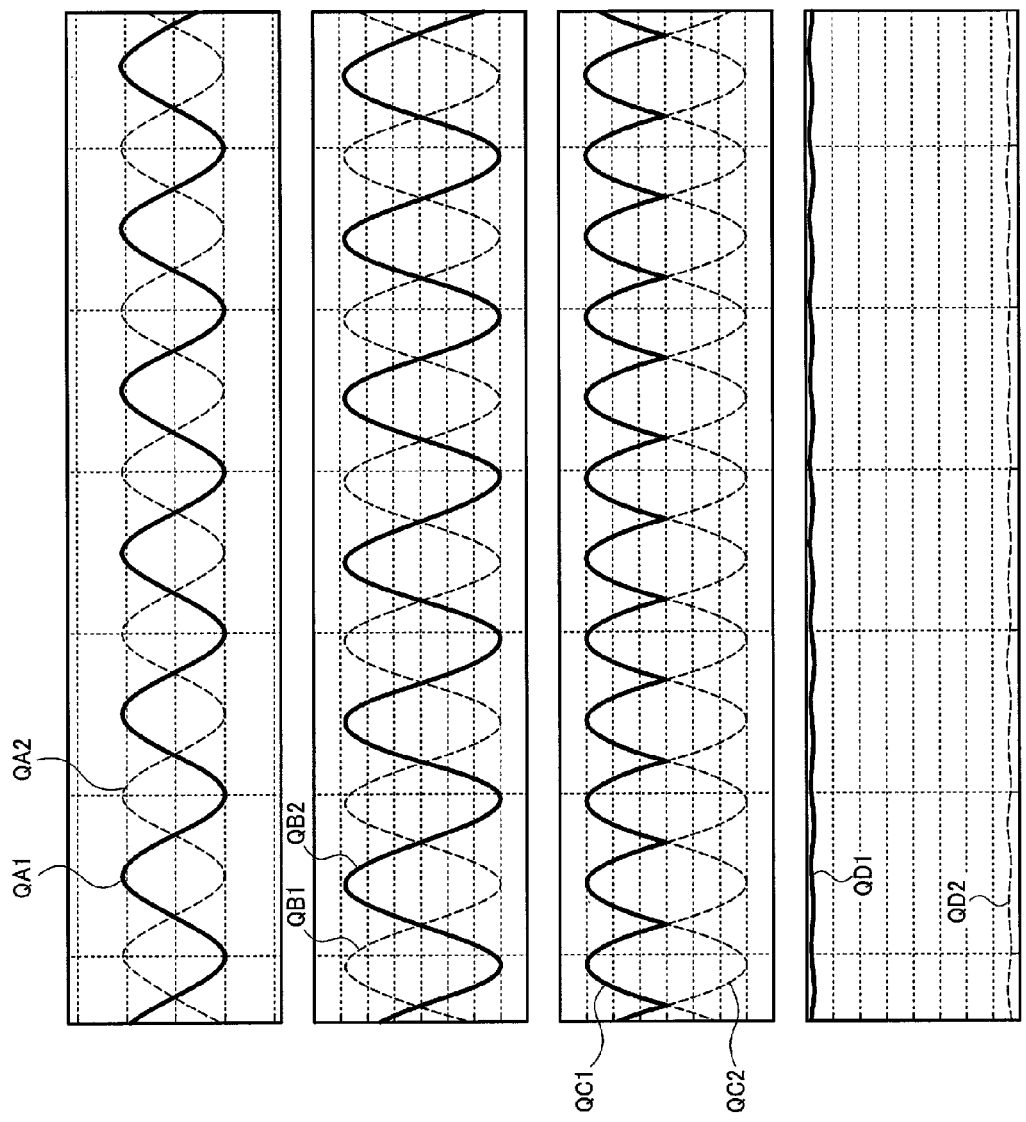
FIG. 13 is a diagram illustrating a signal waveform example of each signal of the detection circuit.

FIG. 13 illustrates signal waveform examples of the various signals QA1 and QA2, QB1 and QB2, QC1 and QC2, and QD1 and QD2 of the detection circuit of FIG. 12.

As illustrated in FIG. 13, the signals QA1 and QA2 output from the Q/V conversion circuits 62 and 64 are inversely amplified by the gain adjustment amplifiers 72 and 74 so as to be output as the signals QB1 and QB2. Specifically, the amplification is performed using the above-described gain set by the capacitance ratio C2/C1.

The signals QB1 and QB2 output from the gain adjustment amplifiers 72 and 74 are synchronously detected by the switching mixer 80, so as to be output as the signals QC1 and QC2. Due to the synchronous detection, an unnecessary signal such as 1/f noise is frequency-converted to have a high frequency band. In addition, the filters 92 and 94 perform a low-pass filter process on the signals QC1 and QC2, so as to generate the signals QD1 and QD2. The signals QD1 and QD2 from which the unnecessary signal converted to have a high frequency band is removed through the low-pass filter process are signals having low noise. Further, the signals QD1 and QD2 having low noise are input to the A/D conversion circuit 100 as differential signals, and undergo differential A/D conversion.

Figure 14:
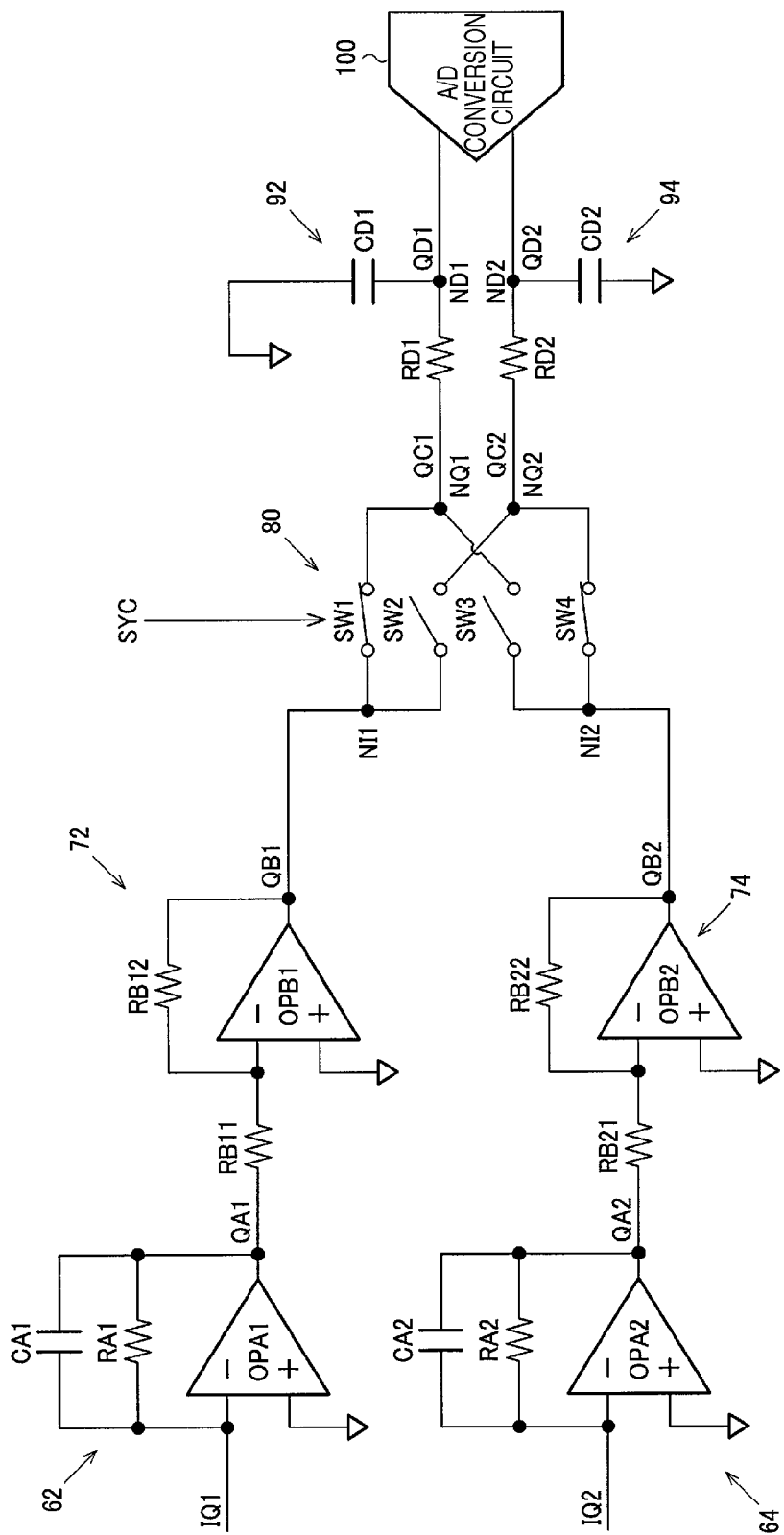
FIG. 14 is a diagram illustrating a specific second configuration example of the full differential switching mixer type detection circuit.

FIG. 14 illustrates a specific second configuration example of the full differential switching mixer type detection circuit.

As described above, in the first configuration example of FIG. 12, the gain adjustment amplifier 72 includes the capacitors CB11 and CB12, the resistive element RB1, and the operational amplifier OPB1. This is also the same for the gain adjustment amplifier 74. In addition, a gain is set by a capacitance ratio. Further, the gain adjustment amplifiers 72 and 74 have frequency characteristics of a high-pass filter.

In contrast, in the second configuration example of FIG. 14, the gain adjustment amplifier 72 includes resistive elements RB11 and RB12, and an operational amplifier OPB1. This is also the same for the gain adjustment amplifier 74. In addition, a gain is set to a resistance ratio. Further, the gain adjustment amplifiers 72 and 74 do not have frequency characteristics of a high-pass filter.

Figure 15A:
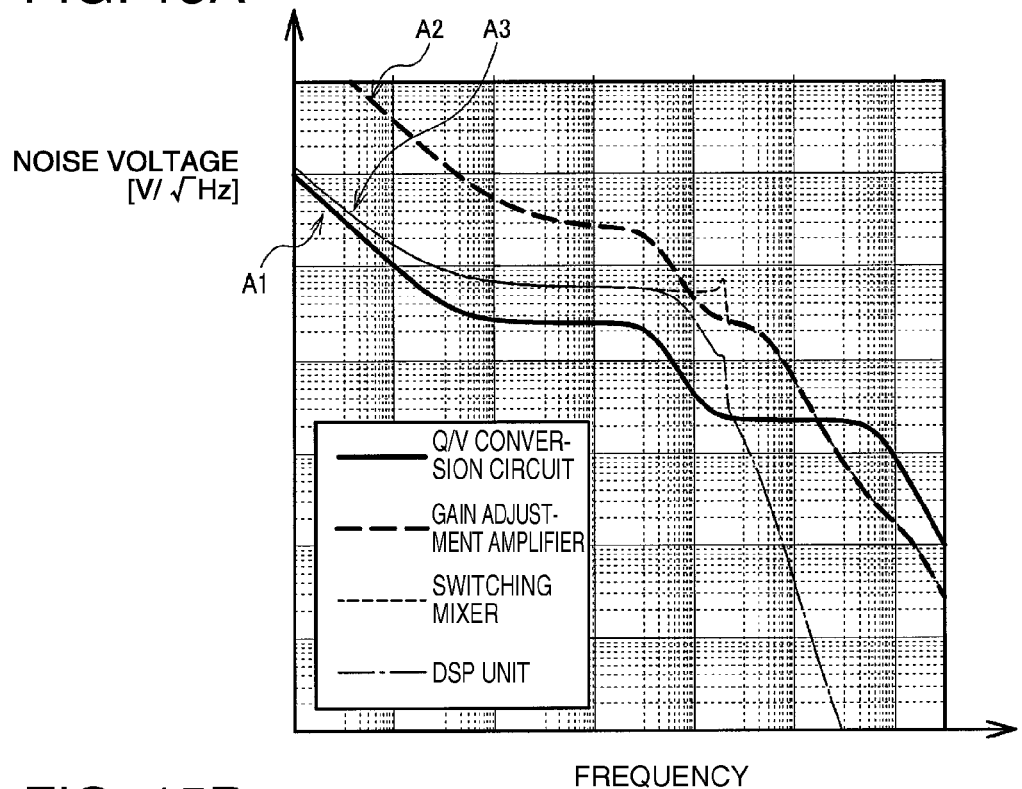
FIGS. 15A and 15B are diagrams illustrating frequency characteristics of noise voltages.

FIG. 15A is a diagram illustrating frequency characteristics of a noise voltage in the second configuration example of FIG. 14. As indicated by A1, high 1/f noise occurs in a low frequency band in the outputs of the Q/V conversion circuits 62 and 64. The 1/f noise of A1 is increased as indicated by A2 due to the signal amplification in the gain adjustment amplifiers 72 and 74. The 1/f noise is reduced due to the frequency conversion in the switching mixer 80 and the low-pass filter characteristics of the filters 92 and 94, but an extent of reduction is not sufficient as indicated by A3. For example, if a clock duty of the switching mixer 80 is deviated from 50%, the 1/f noise leaks, which thus leads to deterioration in noise performance.

Figure 15B:
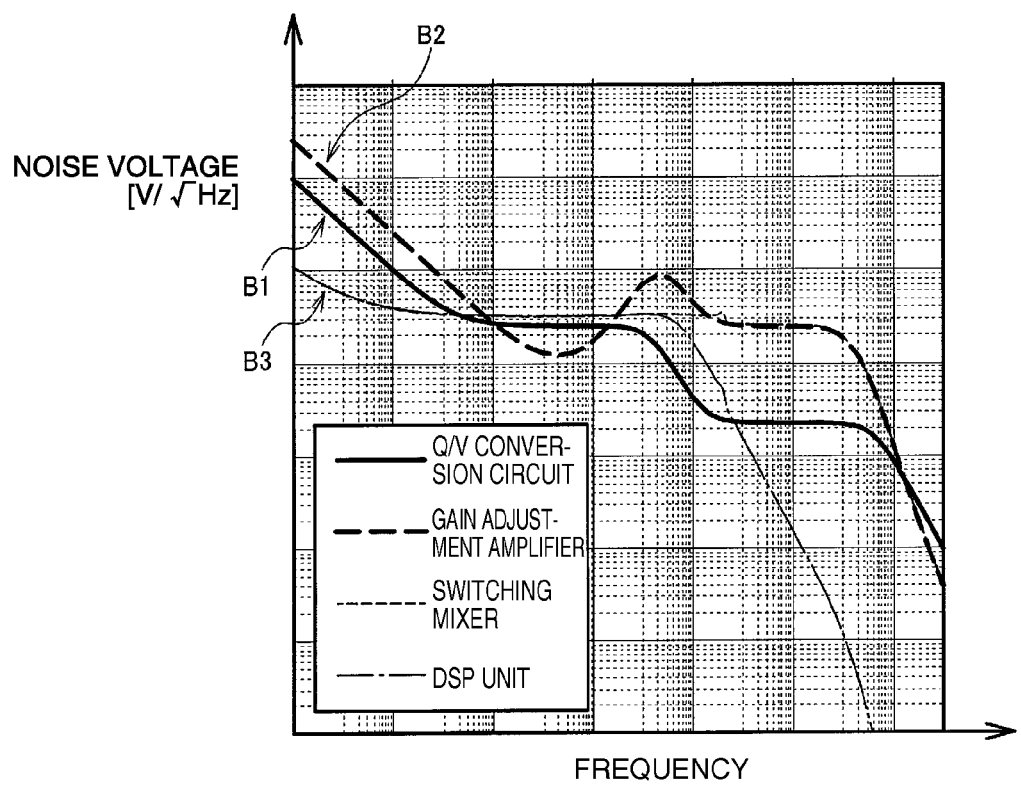

FIG. 15B is a diagram illustrating frequency characteristics of a noise voltage in the first configuration example of FIG. 12. As indicated by B1, high 1/f noise occurs in a low frequency band in the outputs of the Q/V conversion circuits 62 and 64. The 1/f noise of B1 is more considerably reduced as indicated by B2 than in a case of A2 of FIG. 15A due to the high-pass filter characteristics of the gain adjustment amplifiers 72 and 74. The 1/f noise is more sufficiently reduced as indicated by B3 than in a case of A3 of FIG. 15A due to the frequency conversion in the switching mixer 80 and the low-pass filter characteristics of the filters 92 and 94. For example, even if a clock duty of the switching mixer 80 is deviated from 50%, leakage of the 1/f noise can be minimized. Therefore, the A/D conversion circuit 100 can perform A/D conversion on a signal in which the 1/f noise or the like is sufficiently reduced, and a detection process at low noise can be realized while suppressing a large circuit scale or an increase in power consumption.

In the second configuration example of FIG. 14, the offset in the Q/V conversion circuits 62 and 64 is amplified by the gain adjustment amplifiers 72 and 74. For this reason, the offset has a different value in accordance with the gain set by the gain adjustment amplifiers 72 and 74 when viewed from the circuits of the subsequent stage (the A/D conversion circuit and the DSP unit). For example, if a case where an offset is adjusted by the circuits of the subsequent stage such as the DSP unit 110 is considered, the offset is preferably adjusted by one-time inspection. However, in the second configuration example of FIG. 14, there is a problem in that the offset is required to be adjusted for each gain set by the gain adjustment amplifiers 72 and 74, and thus the process is complex.

In relation to this factor, in the first configuration example of FIG. 12, the offset of the Q/V conversion circuits 62 and 64 is removed by the high-pass filter characteristics of the gain adjustment amplifiers 72 and 74. Therefore, when viewed from the circuits of the subsequent stage such as the DSP unit 110, only an offset of the gain adjustment amplifiers 72 and 74 is observed regardless of gain settings of the gain adjustment amplifiers 72 and 74. In addition, the offset is not required to be adjusted for each gain set by the gain adjustment amplifiers 72 and 74, and thus the process can be simplified. In addition, as described above, the 1/f noise of the Q/V conversion circuits 62 and 64 is removed by the high-pass filter characteristics of the gain adjustment amplifiers 72 and 74, and the 1/f noise of the gain adjustment amplifiers 72 and 74 is removed by the frequency conversion in the switching mixer 80 and the low-pass filter characteristics of the filters 92 and 94. Therefore, the input stage of the A/D conversion circuit 100 has a configuration in which the 1/f noise occurring in an active circuit is not observed, and thus has an optimal configuration as a circuit configuration of a detection circuit in which noise in a low frequency band is considered to be important.

Figure 16:
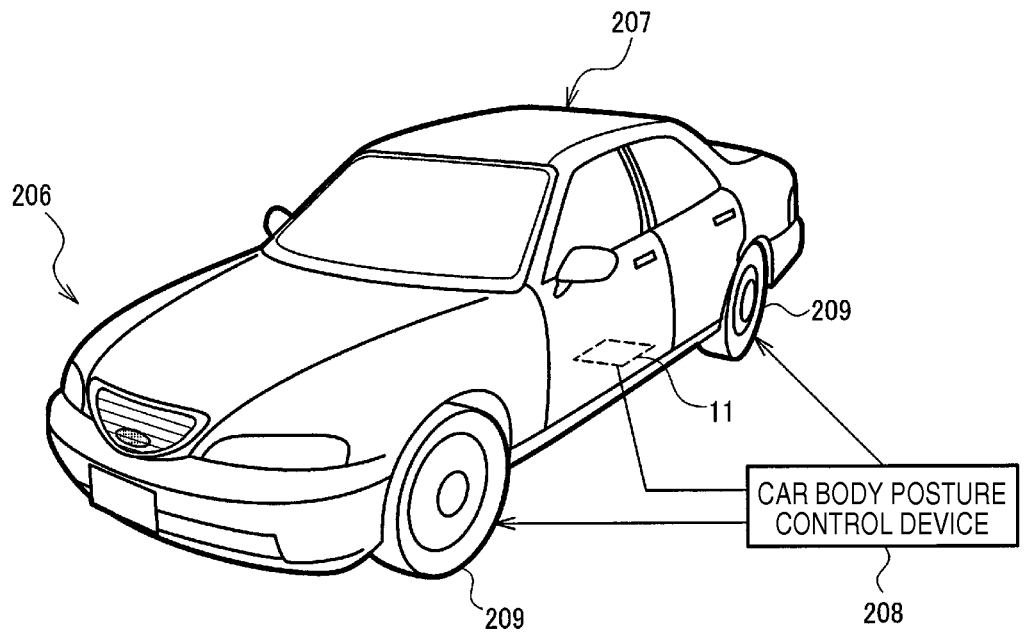
FIG. 16 is a conceptual diagram schematically illustrating a configuration of an automobile as a specific example of a moving object.

In addition, the gyro sensor 510 (sensor) of the present embodiment may be incorporated into various moving objects such as a car, an aircraft, a motorbike, a bicycle, and a ship. The moving objects are equipment or instruments which are provided with, for example, driving mechanisms such as engines or motors, steering mechanisms such as handles or rudders, and various electronic apparatuses, and move on the ground, in the air, and on the sea. FIG. 16 schematically illustrates an automobile 206 as a specific example of the moving object. The gyro sensor 510 including the vibrator 10 and the detection device 20 is incorporated into the automobile 206. The gyro sensor 510 can detect a posture of a car body 207. A detection signal of the gyro sensor 510 may be supplied to a car body posture control device 208. The car body posture control device 208 may control hardness and softness of a suspension or a brake of each car wheel 209, for example, in accordance with a posture of the car body 207. In addition, such posture control may be used in various moving objects such as a bipedal walking robot, an airplane, and a helicopter. In order to perform posture control, the gyro sensor 510 may be incorporated thereinto.

Although the present embodiment has been described as above, it can be easily understood by a person skilled in the art that various modifications without substantially departing from the new matters and effects of the invention are possible. Therefore, these modifications are all included in the scope of the invention. For example, in the specification or the drawings, the terminologies (the gyro sensor, the vibrator, the angular velocity information, the non-inverting input terminal, the inverting input terminal, and the like) which are mentioned at least once along with different terminologies (the sensor, the physical quantity transducer, the physical quantity, the first input terminal, and the second input terminal, and the like) which have broader senses or the same meanings may be replaced with the different terminologies in any location of the specification or the drawings. In addition, a configuration of the detection device, the sensor, or the electronic apparatus, and a structure or the like of the vibrator are not also limited to the above description, and may have various modifications.

The entire disclosure of Japanese Patent Application No. 2013-060874, filed Mar. 22, 2013 is expressly incorporated by reference herein.

What is claimed is:

1. A detection device comprising:
a driving circuit that drives a vibrator; and
a detection circuit that receives a detection signal from the vibrator and performs a detection process of detecting a physical quantity signal corresponding to a physical quantity from the detection signal,
wherein the driving circuit performs intermittent driving in which the vibrator is driven in a driving period, and is not driven in a non-driving period,
wherein the detection circuit performs the detection process of the physical quantity signal in the non-driving period of the intermittent driving, and
wherein the driving circuit performs the intermittent driving in which the driving period and the non-driving period of the vibrator are alternately repeated.

2. The detection device according to claim 1,
wherein the driving circuit includes a driving signal output circuit that outputs a driving signal to the vibrator, and
wherein the driving signal output circuit includes at least one of a circuit that outputs a fixed voltage and a circuit that sets an output node of the driving signal output circuit to a high impedance state, in the non-driving period.

3. The detection device according to claim 2,
wherein the driving signal output circuit outputs the driving signal of a rectangular wave in the driving period of the vibrator.

4. The detection device according to claim 1,
wherein the detection circuit includes at least one of a synchronous detection circuit that performs synchronous detection and an A/D conversion circuit that performs A/D conversion on the detection signal, and
wherein at least one of a synchronous detection operation of the synchronous detection circuit and an A/D conversion operation of the A/D conversion circuit is stopped in the driving period.

5. The detection device according to claim 1,
wherein the driving circuit includes
an amplification circuit that amplifies the detection signal from the vibrator; and
a gain control circuit that performs gain control on the basis of an output signal of the amplification circuit, and
wherein, in the non-driving period, an operation of the amplification circuit is not stopped, and operations of at least some circuits of the gain control circuit are stopped.

6. The detection device according to claim 1,
wherein the detection circuit includes a low-pass filter having a frequency characteristic which allows a physical quantity signal corresponding to the physical quantity to pass through the low-pass filter so as to attenuate an unnecessary signal, and
wherein, when a cutoff frequency of the low-pass filter is fc, lengths of the driving period and the non-driving period are respectively T1 and T2, a relationship of $1/(T1+T2) > fc$ is satisfied.

7. The detection device according to claim 1,
wherein the detection circuit does not perform the detection process of the physical quantity signal in the driving period, and performs the detection process of the physical quantity signal in the non-driving period.

8. The detection device according to claim 1, further comprising:
a mode switching register that sets switching between an intermittent driving mode in which the intermittent driving is performed and a normal driving mode in which continuous driving is performed.

9. The detection device according to claim 1, further comprising:
a period setting register that sets lengths of the driving period and the non-driving period.

10. A detection device comprising:
a driving circuit that drives a vibrator; and
a detection circuit that receives a detection signal from the vibrator and performs a detection process of detecting a physical quantity signal corresponding to a physical quantity from the detection signal,
wherein the driving circuit performs intermittent driving in which a driving period and a non-driving period of the vibrator are alternately repeated,
wherein the driving circuit includes a driving signal output circuit that outputs a driving signal to the vibrator, and
wherein the driving signal output circuit includes at least one of a circuit that outputs a fixed voltage and a circuit that sets an output node of the driving signal output circuit to a high impedance state to output at least one of the fixed voltage and the high impedance during the non-driving period of the intermittent driving.

11. The detection device according to claim 1,
wherein the detection circuit includes
a first current-voltage conversion circuit to which a first detection signal is input;
a second current-voltage conversion circuit to which a second detection signal is input;
a first gain adjustment amplifier that amplifies an output signal of the first current-voltage conversion circuit through adjustment of a gain;
a second gain adjustment amplifier that amplifies an output signal of the second current-voltage conversion circuit through adjustment of a gain;
a switching mixer that has a first input node to which an output signal from the first gain adjustment amplifier is input and a second input node to which an output signal from the second gain adjustment amplifier is input, performs synchronous detection on the output signal of the first gain adjustment amplifier and the output signal of the second gain adjustment amplifier which are differential signals on the basis of a synchronization signal from the driving circuit, outputs a first output signal to a first output node and outputs a second output signal to a second output node, wherein the first output signal and the second output signal are differential signals;
a first filter to which the first output signal from the first output node of the switching mixer is input;
a second filter to which the second output signal from the second output node of the switching mixer is input; and
an A/D conversion circuit that receives an output signal from the first filter and an output signal from the second filter and performs differential A/D conversion thereon.

12. The detection device according to claim 10,
wherein the detection circuit includes
a first current-voltage conversion circuit to which a first detection signal is input;
a second current-voltage conversion circuit to which a second detection signal is input;

a first gain adjustment amplifier that amplifies an output signal of the first current-voltage conversion circuit through adjustment of a gain;

a second gain adjustment amplifier that amplifies an output signal of the second current-voltage conversion circuit through adjustment of a gain;

a switching mixer that has a first input node to which an output signal from the first gain adjustment amplifier is input and a second input node to which an output signal from the second gain adjustment amplifier is input, performs synchronous detection on the output signal of the first gain adjustment amplifier and the output signal of the second gain adjustment amplifier which are differential signals on the basis of a synchronization signal from the driving circuit, outputs a first output signal to a first output node and outputs a second output signal to a second output node, wherein the first output signal and the second output signal are differential signals;

a first filter to which the first output signal from the first output node of the switching mixer is input;

a second filter to which the second output signal from the second output node of the switching mixer is input; and an A/D conversion circuit that receives an output signal from the first filter and an output signal from the second filter and performs differential A/D conversion thereon.

13. A sensor comprising:
the detection device according to claim 1; and
the vibrator.

14. A sensor comprising:
the detection device according to claim 10; and
the vibrator.

15. An electronic apparatus comprising the detection device according to claim 1.

16. An electronic apparatus comprising the detection device according to claim 10.

17. A moving object comprising the detection device according to claim 1.

18. A moving object comprising the detection device according to claim 10.

* * * * *